US012405968B2

(12) United States Patent
Palmer et al.

(10) Patent No.: US 12,405,968 B2
(45) Date of Patent: Sep. 2, 2025

(54) TECHNIQUES FOR MANAGING DATA

(71) Applicant: Apple Inc., Cupertino, CA (US)

(72) Inventors: Alexander D. Palmer, San Jose, CA (US); Aaron Cotter, San Francisco, CA (US); Michael G. Abood, Emerald Hills, CA (US); Michael J. Zhu, Cupertino, CA (US); Sumit Wattal, San Jose, CA (US)

( * ) Notice: Subject to any disclaimer, the term of this patent is extended or adjusted under 35 U.S.C. 154(b) by 0 days.

(21) Appl. No.: 18/584,987

(22) Filed: Feb. 22, 2024

(65) Prior Publication Data

US 2024/0403319 A1 Dec. 5, 2024

Related U.S. Application Data

(60) Provisional application No. 63/470,796, filed on Jun. 2, 2023.

(51) Int. Cl.
| *G06F 16/00* | (2019.01) |
| *G06F 16/22* | (2019.01) |
| *G06F 16/23* | (2019.01) |
| *G06F 16/27* | (2019.01) |

(52) U.S. Cl.
CPC .......... *G06F 16/27* (2019.01); *G06F 16/2237* (2019.01); *G06F 16/2365* (2019.01)

(58) Field of Classification Search
CPC ... G06F 16/27; G06F 16/2237; G06F 16/2365
See application file for complete search history.

(56) References Cited

U.S. PATENT DOCUMENTS

| 11,301,431 | B2* | 4/2022 | Jewell | G06F 16/1734 |
| 11,321,303 | B2* | 5/2022 | Raman | H04L 41/5019 |
| 11,397,721 | B2* | 7/2022 | Raman | G06F 16/184 |
| 2008/0274757 | A1* | 11/2008 | Lovell | H04W 4/35 |
| | | | | 455/466 |
| 2010/0332682 | A1* | 12/2010 | Sharp | H04L 67/1095 |
| | | | | 709/248 |
| 2014/0259005 | A1* | 9/2014 | Jeffrey | G06F 8/65 |
| | | | | 717/173 |
| 2014/0358852 | A1* | 12/2014 | Yurchenko | G06F 17/175 |
| | | | | 707/610 |
| 2015/0186538 | A1* | 7/2015 | Yan | G06F 40/12 |
| | | | | 707/722 |
| 2017/0178064 | A1* | 6/2017 | Olejak | G08B 21/0227 |
| 2017/0308602 | A1* | 10/2017 | Raghunathan | G06F 16/273 |
| 2019/0373058 | A1* | 12/2019 | De Almeida Forjaz de Lacerda | H04W 56/0015 |

(Continued)

*Primary Examiner* — Noosha Arjomandi

(57) ABSTRACT

Some techniques are described herein for tracking items across different devices. Such techniques synchronize a portion of each item while locally storing another portion. In some examples, the synchronization is performed via a conflict-free replicated data type (CRDT) and includes exchanging state vectors and/or hashes corresponding to portions of items that are being synchronized. Other techniques incrementally update local views of data as new data is received. Such techniques use storage plans that maintain operations for different local views. Other techniques manage the order of updates of different local views of data using various sets of criteria described herein. For example, some views can intentionally be left out of date while other views can be updated more frequently to satisfy requests for such views.

39 Claims, 11 Drawing Sheets

(56) References Cited

U.S. PATENT DOCUMENTS

| | | | | |
|---|---|---|---|---|
| 2021/0397600 | A1* | 12/2021 | Desai | H04L 9/0643 |
| 2022/0121627 | A1* | 4/2022 | Inbar | G06F 16/1805 |
| 2022/0391381 | A1* | 12/2022 | Thimbleby | G06F 16/275 |
| 2023/0297588 | A1* | 9/2023 | Sköldström | G06F 1/12 |
| | | | | 707/634 |
| 2024/0061826 | A1* | 2/2024 | Beri | G06F 16/2379 |
| 2024/0121297 | A1* | 4/2024 | Vaddadi | H04L 67/1059 |
| 2024/0267427 | A1* | 8/2024 | Syed | H04L 67/1095 |

* cited by examiner

TECHNIQUES FOR MANAGING DATA

CROSS-REFERENCE TO RELATED APPLICATIONS

The present application claims priority to U.S. Provisional Patent Application Ser. No. 63/470,796, entitled "TECHNIQUES FOR MANAGING DATA" filed Jun. 2, 2023, which is hereby incorporated by reference in its entirety for all purposes.

BACKGROUND

Electronic devices are becoming increasingly interconnected. Such electronic devices often synchronize data with each other. Managing data during synchronization has become more difficult as the amount of data on an electronic device has increased. Accordingly, there is a need to improve techniques for managing data.

SUMMARY

Current techniques for managing data are generally ineffective and/or inefficient. For example, some techniques require synchronization of all data between devices, causing excessive duplication in many situations. For another example, some techniques require streams and/or other sets of data to be reactively processed for queries from consumers, increasing latency of such queries. For another example, some techniques require views of data to be updated more frequently than they need to be, spending resources for many views that are never used in some situations. This disclosure provides more effective and/or efficient techniques for managing data using examples of different types of data on a personal computer system. It should be recognized that other types of data and/or devices can be used with techniques described herein. For example, servers can use techniques described herein. In addition, techniques optionally complement or replace other techniques for managing data.

Some techniques are described herein for tracking items across different devices. Such techniques synchronize a portion of each item while locally storing another portion. In some examples, the synchronization is performed via a conflict-free replicated data type (CRDT) and includes exchanging state vectors and/or hashes corresponding to portions of items that are being synchronized. Other techniques incrementally update local views of data as new data is received. Such techniques use storage plans that maintain operations for different local views. Other techniques manage the order of updates of different local views of data using various sets of criteria described herein. For example, some views can intentionally be left out of date while other views can be updated more frequently to satisfy requests for such views.

In some examples, a method that is performed at a first process executing on a first computer system is described. In some examples, the method comprises: receiving, from a second process executing on the first computer system, a request to synchronize a first item; identifying a first set of data of the first item, wherein the first set of data is specific to the first computer system; identifying a second set of data of the first item, wherein the second of data is not specific to the first computer system, and wherein the second set of data is different from the first set of data; and synchronizing, with a second computer system different from the first computer system, the second set of data without synchronizing the first set of data.

In some examples, a non-transitory computer-readable storage medium storing one or more programs configured to be executed by one or more processors of a first computer system is described. In some examples, the one or more programs includes instructions for a first process of the first computer system to: receive, from a second process executing on the first computer system, a request to synchronize a first item; identify a first set of data of the first item, wherein the first set of data is specific to the first computer system; identify a second set of data of the first item, wherein the second of data is not specific to the first computer system, and wherein the second set of data is different from the first set of data; and synchronize, with a second computer system different from the first computer system, the second set of data without synchronizing the first set of data.

In some examples, a transitory computer-readable storage medium storing one or more programs configured to be executed by one or more processors of a first computer system is described. In some examples, the one or more programs includes instructions for a first process to: receive, from a second process executing on the first computer system, a request to synchronize a first item; identify a first set of data of the first item, wherein the first set of data is specific to the first computer system; identify a second set of data of the first item, wherein the second of data is not specific to the first computer system, and wherein the second set of data is different from the first set of data; and synchronize, with a second computer system different from the first computer system, the second set of data without synchronizing the first set of data.

In some examples, a first computer system is described. In some examples, the first computer system comprises one or more processors and memory storing one or more programs configured to be executed by the one or more processors. In some examples, the one or more programs includes instructions for a first process to: receive, from a second process executing on the first computer system, a request to synchronize a first item; identify a first set of data of the first item, wherein the first set of data is specific to the first computer system; identify a second set of data of the first item, wherein the second of data is not specific to the first computer system, and wherein the second set of data is different from the first set of data; and synchronize, with a second computer system different from the first computer system, the second set of data without synchronizing the first set of data.

In some examples, a first computer system is described. In some examples, the first computer system comprises means for a first process to perform each of the following steps: receiving, from a second process executing on the first computer system, a request to synchronize a first item; identifying a first set of data of the first item, wherein the first set of data is specific to the first computer system; identifying a second set of data of the first item, wherein the second of data is not specific to the first computer system, and wherein the second set of data is different from the first set of data; and synchronizing, with a second computer system different from the first computer system, the second set of data without synchronizing the first set of data.

In some examples, a computer program product is described. In some examples, the computer program product comprises one or more programs configured to be executed by one or more processors of a first computer system. In some examples, the one or more programs include instructions for a first process to: receive, from a second process executing on the first computer system, a request to synchronize a first item; identify a first set of data of the first item, wherein the first set of data is specific to the first computer system; identify a second set of data of the first item, wherein the second of data is not specific to the first computer system, and wherein the second set of data is different from the first set of data; and synchronize, with a second computer system different from the first computer system, the second set of data without synchronizing the first set of data.

In some examples, a method that is performed at a daemon of a computer system is described. In some examples, the method comprises: detecting a first event corresponding to a first stream of data that is stored at a first location; in response to detecting the first event: identifying a first storage plan corresponding to the first stream of data; identifying a last location in the first stream of data; and performing, on a portion of the first stream of data beginning at the last location in the first stream of data, a first set of one or more operations corresponding to the first storage plan; and after performing the first set of one or more operations of the first storage plan, storing, at a second location of persistent memory of the computer system, a result of performing the first set of one or more operations, wherein the second location is different from the first location, and wherein the result is to be accessed by a user application of the computer system.

In some examples, a non-transitory computer-readable storage medium storing one or more programs configured to be executed by one or more processors of a computer system is described. In some examples, the one or more programs includes instructions for a daemon to: detect a first event corresponding to a first stream of data that is stored at a first location; in response to detecting the first event: identify a first storage plan corresponding to the first stream of data; identify a last location in the first stream of data; and perform, on a portion of the first stream of data beginning at the last location in the first stream of data, a first set of one or more operations corresponding to the first storage plan; and after performing the first set of one or more operations of the first storage plan, store, at a second location of persistent memory of the computer system, a result of performing the first set of one or more operations, wherein the second location is different from the first location, and wherein the result is to be accessed by a user application of the computer system.

In some examples, a transitory computer-readable storage medium storing one or more programs configured to be executed by one or more processors of a computer system is described. In some examples, the one or more programs includes instructions for a daemon to: detect a first event corresponding to a first stream of data that is stored at a first location; in response to detecting the first event: identify a first storage plan corresponding to the first stream of data; identify a last location in the first stream of data; and perform, on a portion of the first stream of data beginning at the last location in the first stream of data, a first set of one or more operations corresponding to the first storage plan; and after performing the first set of one or more operations of the first storage plan, store, at a second location of persistent memory of the computer system, a result of performing the first set of one or more operations, wherein the second location is different from the first location, and wherein the result is to be accessed by a user application of the computer system.

In some examples, a computer system is described. In some examples, the computer system comprises one or more processors and memory storing one or more programs configured to be executed by the one or more processors. In some examples, the one or more programs includes instructions for a daemon to: detect a first event corresponding to a first stream of data that is stored at a first location; in response to detecting the first event: identify a first storage plan corresponding to the first stream of data; identify a last location in the first stream of data; and perform, on a portion of the first stream of data beginning at the last location in the first stream of data, a first set of one or more operations corresponding to the first storage plan; and after performing the first set of one or more operations of the first storage plan, store, at a second location of persistent memory of the computer system, a result of performing the first set of one or more operations, wherein the second location is different from the first location, and wherein the result is to be accessed by a user application of the computer system.

In some examples, a computer system is described. In some examples, the computer system comprises means for a daemon to perform each of the following steps: detecting a first event corresponding to a first stream of data that is stored at a first location; in response to detecting the first event: identifying a first storage plan corresponding to the first stream of data; identifying a last location in the first stream of data; and performing, on a portion of the first stream of data beginning at the last location in the first stream of data, a first set of one or more operations corresponding to the first storage plan; and after performing the first set of one or more operations of the first storage plan, storing, at a second location of persistent memory of the computer system, a result of performing the first set of one or more operations, wherein the second location is different from the first location, and wherein the result is to be accessed by a user application of the computer system.

In some examples, a computer program product is described. In some examples, the computer program product comprises one or more programs configured to be executed by one or more processors of a computer system. In some examples, the one or more programs include instructions for a daemon to: detect a first event corresponding to a first stream of data that is stored at a first location; in response to detecting the first event: identify a first storage plan corresponding to the first stream of data; identify a last location in the first stream of data; and perform, on a portion of the first stream of data beginning at the last location in the first stream of data, a first set of one or more operations corresponding to the first storage plan; and after performing the first set of one or more operations of the first storage plan, store, at a second location of persistent memory of the computer system, a result of performing the first set of one or more operations, wherein the second location is different from the first location, and wherein the result is to be accessed by a user application of the computer system.

In some examples, a method that is performed at a daemon of a computer system is described. In some examples, the method comprises: detecting a first event corresponding to a first stream of data that is stored at a first location of the computer system; in response to detecting the first event: in accordance with a determination that a first set of one or more criteria is satisfied with respect to a first view stored at a second location of the computer system, wherein the second location is different from the first location, updating the first view before updating a second view stored at a third location of the computer system, wherein the third location is different from the first location and the second location; and in accordance with a determination that a second set of one or more criteria is satisfied with respect to the second view, updating the second view before updating the first view.

In some examples, a non-transitory computer-readable storage medium storing one or more programs configured to be executed by one or more processors of a computer system is described. In some examples, the one or more programs includes instructions for a daemon to: detect a first event corresponding to a first stream of data that is stored at a first location of the computer system; and in response to detecting the first event: in accordance with a determination that a first set of one or more criteria is satisfied with respect to a first view stored at a second location of the computer system, wherein the second location is different from the first location, update the first view before updating a second view stored at a third location of the computer system, wherein the third location is different from the first location and the second location; and in accordance with a determination that a second set of one or more criteria is satisfied with respect to the second view, update the second view before updating the first view.

In some examples, a transitory computer-readable storage medium storing one or more programs configured to be executed by one or more processors of a computer system is described. In some examples, the one or more programs includes instructions for a daemon to: detect a first event corresponding to a first stream of data that is stored at a first location of the computer system; and in response to detecting the first event: in accordance with a determination that a first set of one or more criteria is satisfied with respect to a first view stored at a second location of the computer system, wherein the second location is different from the first location, update the first view before updating a second view stored at a third location of the computer system, wherein the third location is different from the first location and the second location; and in accordance with a determination that a second set of one or more criteria is satisfied with respect to the second view, update the second view before updating the first view.

In some examples, a computer system is described. In some examples, the computer system comprises one or more processors and memory storing one or more programs configured to be executed by the one or more processors. In some examples, the one or more programs includes instructions for a daemon to: detect a first event corresponding to a first stream of data that is stored at a first location of the computer system; and in response to detecting the first event: in accordance with a determination that a first set of one or more criteria is satisfied with respect to a first view stored at a second location of the computer system, wherein the second location is different from the first location, update the first view before updating a second view stored at a third location of the computer system, wherein the third location is different from the first location and the second location; and in accordance with a determination that a second set of one or more criteria is satisfied with respect to the second view, update the second view before updating the first view.

In some examples, a computer system is described. In some examples, the computer system comprises means for a daemon to perform each of the following steps: detecting a first event corresponding to a first stream of data that is stored at a first location of the computer system; in response to detecting the first event: in accordance with a determination that a first set of one or more criteria is satisfied with respect to a first view stored at a second location of the computer system, wherein the second location is different from the first location, updating the first view before updating a second view stored at a third location of the computer system, wherein the third location is different from the first location and the second location; and in accordance with a determination that a second set of one or more criteria is satisfied with respect to the second view, updating the second view before updating the first view.

In some examples, a computer program product is described. In some examples, the computer program product comprises one or more programs configured to be executed by one or more processors of a computer system. In some examples, the one or more programs include instructions for a daemon to: detect a first event corresponding to a first stream of data that is stored at a first location of the computer system; and in response to detecting the first event: in accordance with a determination that a first set of one or more criteria is satisfied with respect to a first view stored at a second location of the computer system, wherein the second location is different from the first location, update the first view before updating a second view stored at a third location of the computer system, wherein the third location is different from the first location and the second location; and in accordance with a determination that a second set of one or more criteria is satisfied with respect to the second view, update the second view before updating the first view.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described examples, reference should be made to the Detailed Description below, in conjunction with the following drawings in which like reference numerals refer to corresponding parts throughout the figures.

DETAILED DESCRIPTION

Figure 1:
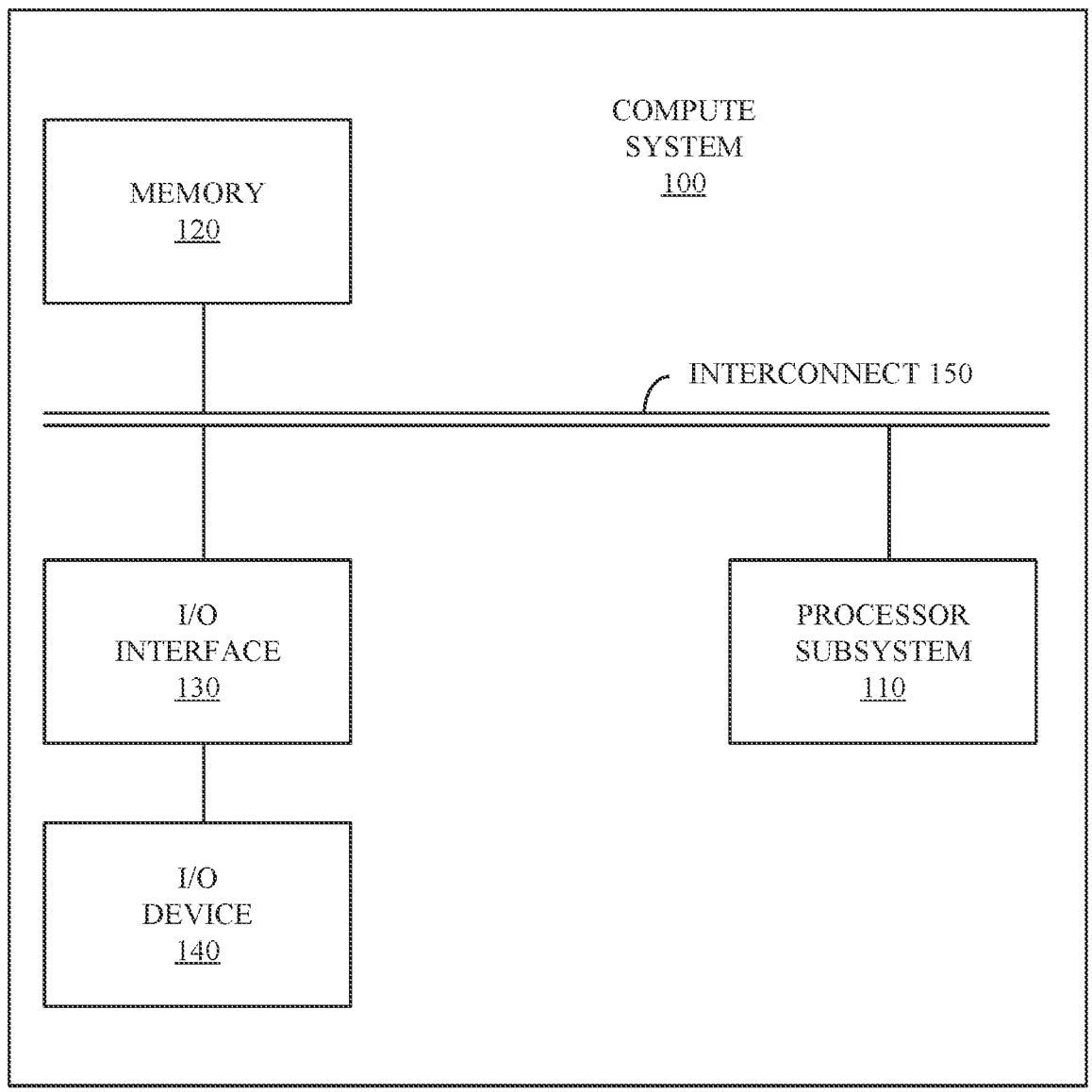
FIG. 1 is a block diagram illustrating a compute system in accordance with some examples.

The following description sets forth exemplary methods, parameters, and the like. It should be recognized, however, that such description is not intended as a limitation on the scope of the present disclosure but is instead provided as a description of exemplary examples.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described examples. In some examples, the first subsystem and the second subsystem are two separate references to the same subsystem. In some examples, the first subsystem and the second subsystem are both subsystems, but they are not the same subsystem or the same type of subsystem.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive executive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 600, 800, and 900 (FIGS. 6, 8, and 9) described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly wired to the network.

Figure 2:
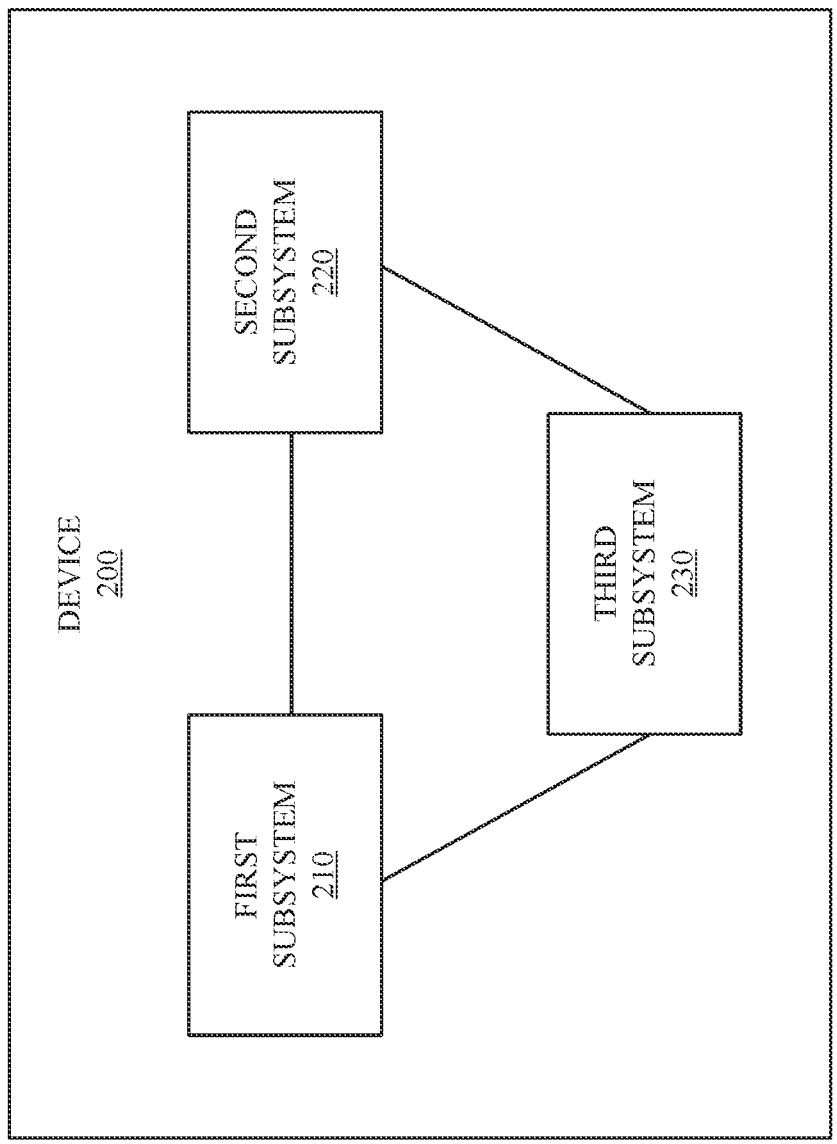
FIG. 2 is a block diagram illustrating a device with interconnected subsystems in accordance with some examples.

FIG. 2 illustrates a block diagram of device 200 with interconnected subsystems in accordance with some examples. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

As used herein, an "installed application" refers to a software application that has been downloaded onto a computer system (e.g., compute system 100 and/or device 200) and is ready to be launched (e.g., become opened) on the device. In some examples, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of a system/global internal state and/or an application internal state). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards techniques for managing data. Such techniques are described in the context of a group of personal computer systems that are all signed into the same user account. It should be recognized that other types of electronic devices can be used with techniques described herein. For example, an accessory and/or server can manage data using techniques described herein. In addition, techniques optionally complement or replace other techniques for managing data.

Some techniques described herein include a data management system that handles entity catalog donations from a wide range of sources (e.g., media applications, messaging applications, communication applications, accessory applications, and/or operating systems). In some examples, the data management system differentially applies dataset changes to a data store (e.g., contacts, installed applications, accessory devices, and/or media items) and synchronizes at least a portion of the data store across devices to produce a stream of delta-updates to one or more consumers of the data store. Some terminology used herein includes content, meta content, content hash, replica identifier, CRDT identifier, and device meta data. In some examples, content includes device-agnostic data (e.g., a name of a contact, a phone number of the contact, and/or an address stored for the contact). In some examples, meta content includes device-specific data (e.g., an identifier used by a device to identify an instance of a contact on the device). In some examples, content hash includes a hash of a portion of an item (e.g., the content and not the meta content described above). In such examples, the content hash can serve as an identifier for deduplicating an item across devices (e.g., the content portion is synchronized while the meta content portion is not synchronized, allowing for meta content that is unique on different devices to not require additional synchronization) and/or can be used as a single identifier for an item from a consumer perspective. For example, when a deletion occurs with respect to an item, the deletion can be propagated across synchronized devices using the content hash as an item identifier. In some examples, a replica identifier includes a unique identifier (e.g., a UUID) representing a replica (e.g., a particular device). In some examples, a CRDT identifier includes a replica identifier and/or a counter (e.g., a clock value, such as a monotonic logical clock). In such examples, the CRDT identifier can be used for (1) an identifier in a state vector for synchronization, (2) identifying updates, and/or (3) maintaining an origin and/or a numeric value for an item. In some examples, device meta data includes an object created from a replica identifier that includes information related to devices, such as a device types of devices.

Figure 3:
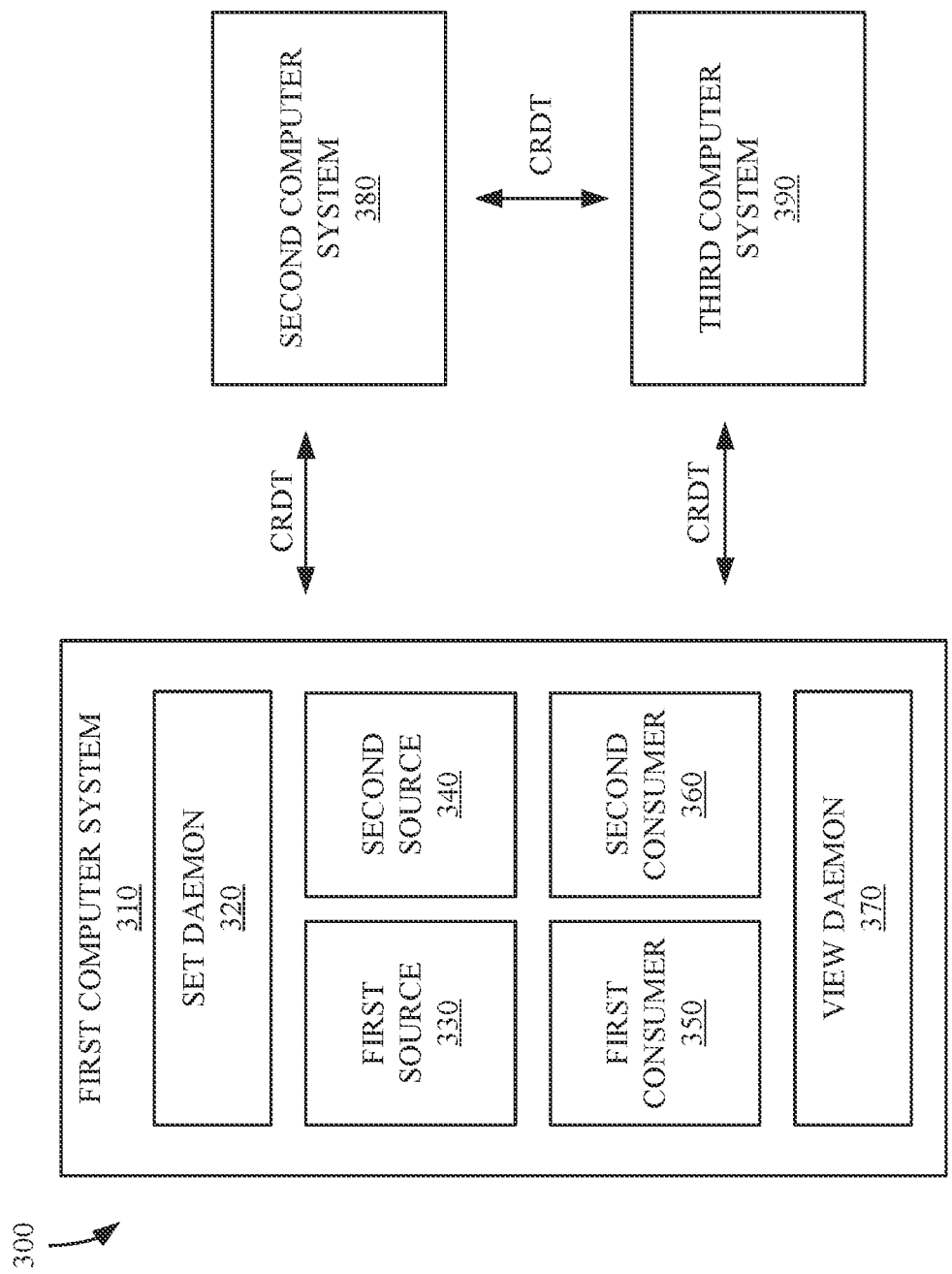
FIG. 3 is a block diagram illustrating a network environment in accordance with some examples.

FIG. 3 is a block diagram illustrating a network environment (e.g., network environment 300) in accordance with some examples. As illustrated, network environment 300 includes first computer system 310, second computer system 380, and third computer system 390. It should be recognized that network environment 300 can include more or fewer computer systems than illustrated in FIG. 3 and that network environment 300 serves an example to assist with description herein.

In some examples, one or more computer systems (e.g., first computer system 310, second computer system 380, and/or third computer system 390) of network environment 300 include one or more components described above with respect to device 200 and/or compute system 100. For example, first computer system 310, second computer system 380, and/or third computer system 390 can be a personal computing device, such as a smart phone, smart watch, tablet, laptop, a smart speaker, and/or desktop, that is logged into a particular user account. In some examples, first computer system 310, second computer system 380, and third computer system 390 are all logged into the same user account (e.g., a single user owns all three computer systems).

As illustrated in FIG. 3, first computer system 310 includes set daemon 320, first source 330, second source 340, first consumer 350, second consumer 360, and view daemon 370. In some examples, set daemon 320 and/or view daemon 370 are background processes that do not include a graphical user interface component. In such examples, one or more of the daemons can be provided by an operating system of first computer system 310 as part of the data management system described herein. It should be recognized that first computer system 310 can include more or fewer daemons and/or some functionality of one daemon can be performed by another daemon. It should also be recognized that, in some examples, second computer system 380 and/or third computer system 390 can include one or more components illustrated in first computer system 310. For example, second computer system 380 and/or third computer system 390 can each include a set daemon that communicates with and/or performs operations similar to set daemon 320 on behalf of second computer system 380 and/or third computer system 390.

In some examples, first source 330 and second source 340 are each processes (e.g., foreground and/or background processes) and/or applications (e.g., user applications, system applications, and/or applications installed on first computer system 310) executing on first computer system 310. In such examples, first source 330 and/or second source 340 can output data, such as a stream of data and/or a message including data. In some examples, the data output by first source 330 and/or second source 340 is sent to set daemon 320, view daemon 370, and/or another process that distributes data to set daemon 320 and/or view daemon 370. In some examples, first source 330 and/or second source 340 may not output data to first consumer 350 and/or second consumer 360. In some examples, first source 330 is unrelated to second source 340, and each output their own data. It should be recognized that first computer system 310 can include more or fewer sources and/or some functionality of one source can be performed by another source. In some examples, a source (e.g., first source 330 and/or second source 340) can be located outside of first computer system 310 (e.g., on a computer system different from first computer system 310) and send data to first computer system 310.

In some examples, first consumer 350 and second consumer 360 are each processes (e.g., foreground and/or background processes) and/or applications (e.g., user applications, system applications, and/or applications installed on first computer system 310) executing on first computer system 310. In such examples, first consumer 350 and/or second consumer 360 can input data, such as a stream of data and/or a message including data. In some examples, the data input by first consumer 350 and/or second consumer 360 is output by set daemon 320, view daemon 370, and/or another process that distributes data from set daemon 320 and/or view daemon 370. For example, first consumer 350 and/or second consumer 360 can receive data directly from set daemon 320 and/or view daemon 370 and/or access a data location for data stored by first consumer 350 and/or second consumer 360. In some examples, first source 330 and/or second source 340 may not output data to first consumer 350 and/or second consumer 360. In some examples, first consumer 350 is unrelated to second consumer 360. In such examples, first consumer 350 and second consumer can each receive data for different purposes. It should be recognized that first computer system 310 can include more or fewer consumers and/or some functionality of one consumer can be performed by another consumer. In some examples, a consumer (e.g., first consumer 350 and/or second consumer 360) can be located outside of first computer system 310 (e.g., on a computer system different from first computer system 310) and receive data from first computer system 310.

In some examples, set daemon 320 manages sets of data between computer systems (e.g., synchronization, input, and/or output of such data). For example, set daemon 320 can receive data from a source (e.g., first source 330 and/or second source 340), split the data into different portions (e.g., as described below with respect to FIG. 4), and send certain portions of the data to other computer systems (e.g., second computer system 380 and/or third computer system 390) for synchronization, as described below with respect to FIGS. 4, 5A-5B, and 6). As illustrated in FIG. 5A and described further below, such synchronization can occur between computer systems (e.g., first computer system 310, second computer system 380, and/or third computer system 390) using a state vector, such as a conflict-free replicated data type (CRDT). In some examples, set daemon 320 uses one or more state vectors for data managed by set daemon 320. In such examples, the one or more state vectors can support enumeration of changes of the data. For example, a state vector can track local delta enumeration (e.g., of meta content, as described above) and/or remote delta enumeration (e.g., of content, as described above). In some examples, set daemon 320 provides a unified application programming interface (API) for different types of data (e.g., time-series and set data), allowing different types of data to be synchronized using the same API.

In some examples, view daemon 370 manages views of data (e.g., local instances of portions of data, sometimes referred to as materialized views) on first computer system 310. For example, view daemon 370 can detect events occurring with respect to streams of data, determine whether such events require updating one or more views at a current time, retrieving storage plans and a last event that was processed for the one or more views, and updating the one or more views based on events detected since the last event that was processed for the one or more views, as described further below with respect to FIGS. 7A-7B, 8, and 9.

Figure 4:
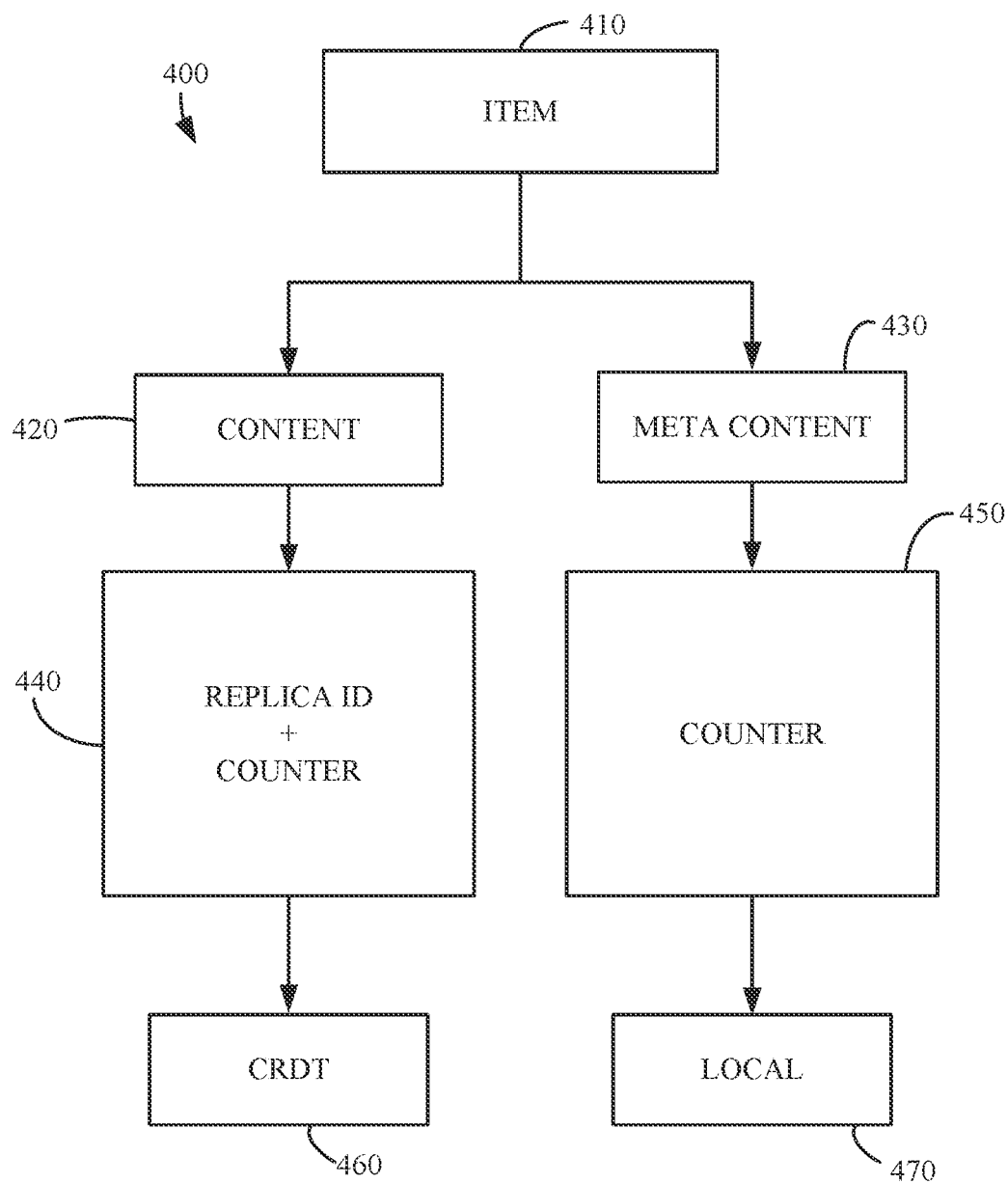
FIG. 4 is a block diagram illustrating a process for synchronizing an item in accordance with some examples.
Figure 5A:
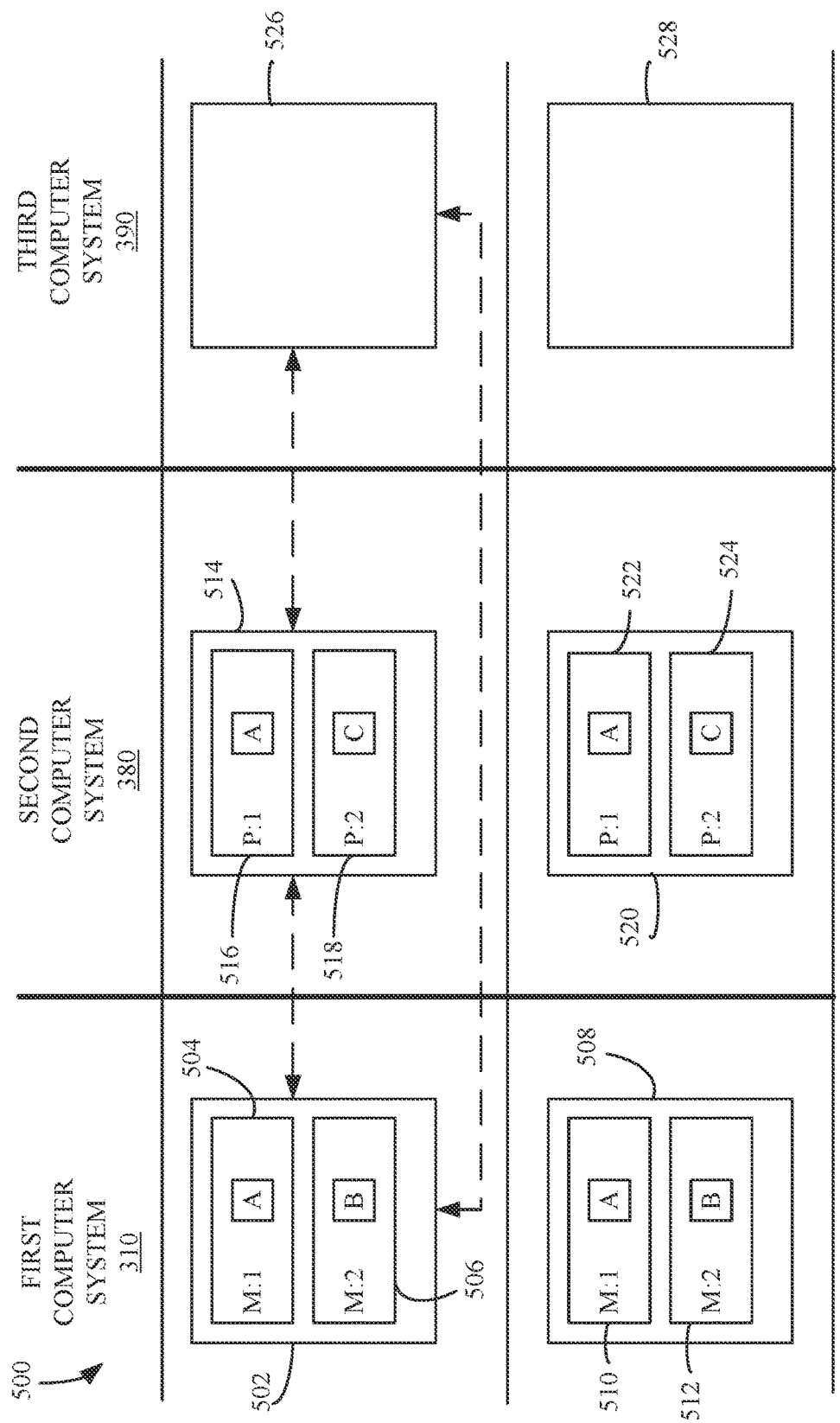
FIGS. 5A-5B are block diagrams illustrating a synchronization process in accordance with some examples.

FIG. 4 is a block diagram illustrating a process (process 400) for synchronizing an item with different computer systems (e.g., first computer system 310, second computer system 380, and/or third computer system 390) in accordance with some examples. It should be recognized that process 400 can include more, fewer, and/or different parts than illustrated in FIG. 4.

As illustrated in FIG. 4, process 400 begins at 410 with an item. In some examples, the item at 410 is received by a set daemon (e.g., set daemon 320) from a source (e.g., first source 330 and/or second source 340). Examples of the item include a contact in an address book, a media item in a media library, an accessory device in automation application, and/or an event in a calendar application.

At 420 and 430, the set daemon splits the item into two different portions (e.g., data structures). For example, a first portion of the item is identified as content (e.g., as described above) and added to a content vector (e.g., sometimes referred to as a content portion) at 420. In such an example, a second portion of the item is identified as meta content (e.g., as described above) and added to a meta content vector (e.g., sometimes referred to as a meta content portion) at 430. In some examples, such split of data is defined in a schema for each type of item (e.g., provided by a process and/or an application providing items of a particular type). Such separation can be used for deduplication purposes during synchronization, as described further below.

The next paragraphs include a few examples of different items separated into different portions (e.g., sometimes referred to as fields), such as Content (e.g., device-agnostic data) and MetaContent (e.g., device-specific data) as described above. In some examples, Content is shared between different devices while MetaContent is not shared between different devices and instead is stored locally on a single device.

The next nineteen paragraphs provide an example of a Contact item. In some examples, the Contact item represents a person in an address book and can be synchronized across devices to determine whether different devices include the person. In the example below, MetaContent is specific to a device (e.g., is assigned to the Contact item by the device and, in some examples, is different for the same person on different devices (e.g., each device would assign a different itemId to a locally-stored Contact item even though multiple devices might have the same type of information for a particular person). In the example below, Content is not specific to a device (e.g., different devices having the same person in their address book would likely have the same information included in the Content portion (e.g., each device would likely have a givenName of "George" and a familyName of "Constanza" for George Constanza).

```
Contact: {
    MetaContent: {
        itemId: "7324:Person"
    }
    Content: {
        givenName: "George"
        familyName: "Costanza"
        phoneNumbers: [
            PhoneNumber: {
                label: "Mobile"
                number: "+1 (234) 555-6789"
            },
            PhoneNumber: {
                label: "Work"
                number: "+1 (876) 555-4321"
            }
        ]
    }
}
```

The next ten paragraphs provide an example of an AppInfo item. In some examples, the AppInfo item represents an application installed on a device and can be synchronized across devices to determine whether different devices include the application. In the example below, MetaContent is specific to a device (e.g., is assigned to the AppInfo item by the device and, in some examples, is different for the same application on different devices (e.g., each device would assign a different itemId to a locally-stored AppInfo item even though multiple devices might have the same type of information for a particular application). In the example below, Content is not specific to a device (e.g., different devices having the same application would likely have the same information included in the Content portion (e.g., each device would likely have display AppName of "Photos" for Photos application).

```
AppInfo: {
    MetaContent: {
        ItemId: "com.mobileslideshow"
        bundleVersion: "600"
    }
    Content: {
        appName: "MobileSlideShow"
        displayAppName: "Photos"
    }
}
```

The next eleven paragraphs provide an example of a HomeEntity item. In some examples, the HomeEntity item represents an accessory device known by a device and can be synchronized across devices to determine whether different devices know about the accessory device. In the example below, MetaContent is specific to a device (e.g., is assigned to the HomeEntity item by the device and, in some examples, is different for the same accessory device on different devices (e.g., each device would assign a different itemId to a locally-stored HomeEntity item even though multiple devices might have the same type of information for a particular accessory device). In the example below, Content is not specific to a device (e.g., different devices knowing about the same accessory device would likely have the same information included in the Content portion (e.g., each device would likely have entityType of "Accessory" for a light accessory).

```
HomeEntity {
    MetaContent: {
        itemId: "122E6"
        deviceInstanceId: "5546"
    }
    Content: {
        entityType: Accessory
        name: "Light"
        roomName: "Living Room"
    }
}
```

The next nine paragraphs provide an example of a MediaEntity item. In some examples, the MediaEntity item represents a media item (e.g., a song) known by and/or included on a device and can be synchronized across devices to determine whether different devices know and/or include the media item. In the example below, MetaContent is specific to a device (e.g., is assigned to the MediaEntity item by the device and, in some examples, is different for the same media item on different devices (e.g., each device would assign a different itemId to a locally-stored MediaEntity item even though multiple devices might have the same type of information for a particular media item) (e.g., each device can have a different numbers of plays (e.g., playCount) of a media item even though multiple devices have the media item stored and/or associated with their media library). In the example below, Content is not specific to a device (e.g., different devices knowing about and/or including the same media item would likely have the same information included in the Content portion (e.g., each device would likely have entityType of "Song" for a song media item).

```
MediaEntity: {
    MetaContent: {
        itemId: "x-media-library://1234"
        playCount: 15
```

```
    }
    Content: {
        entityType: Song
    }
}
```

Referring back to process 400, at 440, after identifying the content portion, the set daemon generates a replica identifier (e.g., as described above) and a counter for the content portion of each item (e.g., a single replica identifier and a single counter is generated for the content at 420).

At 450, after identifying the meta content portion, the set daemon generates a counter for the meta content portion of each item (e.g., a single counter is generated for the meta content at 430). In some examples, a replica identifier is not generated for the meta content portion because the meta content portion is local to first computer system 310 and does not need an identifier corresponding to first computer system 310.

At 460, after generating the CRDT identifier for content portion of the item, the set daemon creates a CRDT using the replica identifier and the counter as an identifier of the item (e.g., the replica identifier and the counter together make up a CRDT identifier) and synchronize the CRDT with one or more other computer systems (e.g., second computer system 380 and third computer system 390). In some examples, synchronization of the CRDT occurs as described below with respect to FIGS. 5A-5B.

At 470, after generating the counter for the meta content portion of the item, the set daemon stores the counter for the meta content portion and the meta content portion locally (e.g., does not synchronize such with other computer systems (e.g., second computer system 380 and third computer system 390)).

In some examples, content and meta content portions are independently serialized and/or hashed to generate a content hash and a meta content hash. In such examples, the content hash can be used as an identifier for an item shared and/or synchronized in the CRDT. In some examples, items on different devices with the same content portion and/or content hash are tracked as a single item across the devices. In some examples, a content hash is used to determine equivalence during synchronization by sending the content hash (e.g., and not content corresponding to the content hash) and comparing content hashes, reducing the overall amount of data sent between devices. In some examples, meta content is not shared and/or synchronized between devices, reducing an overall amount of data sent between devices.

Figure 5B:
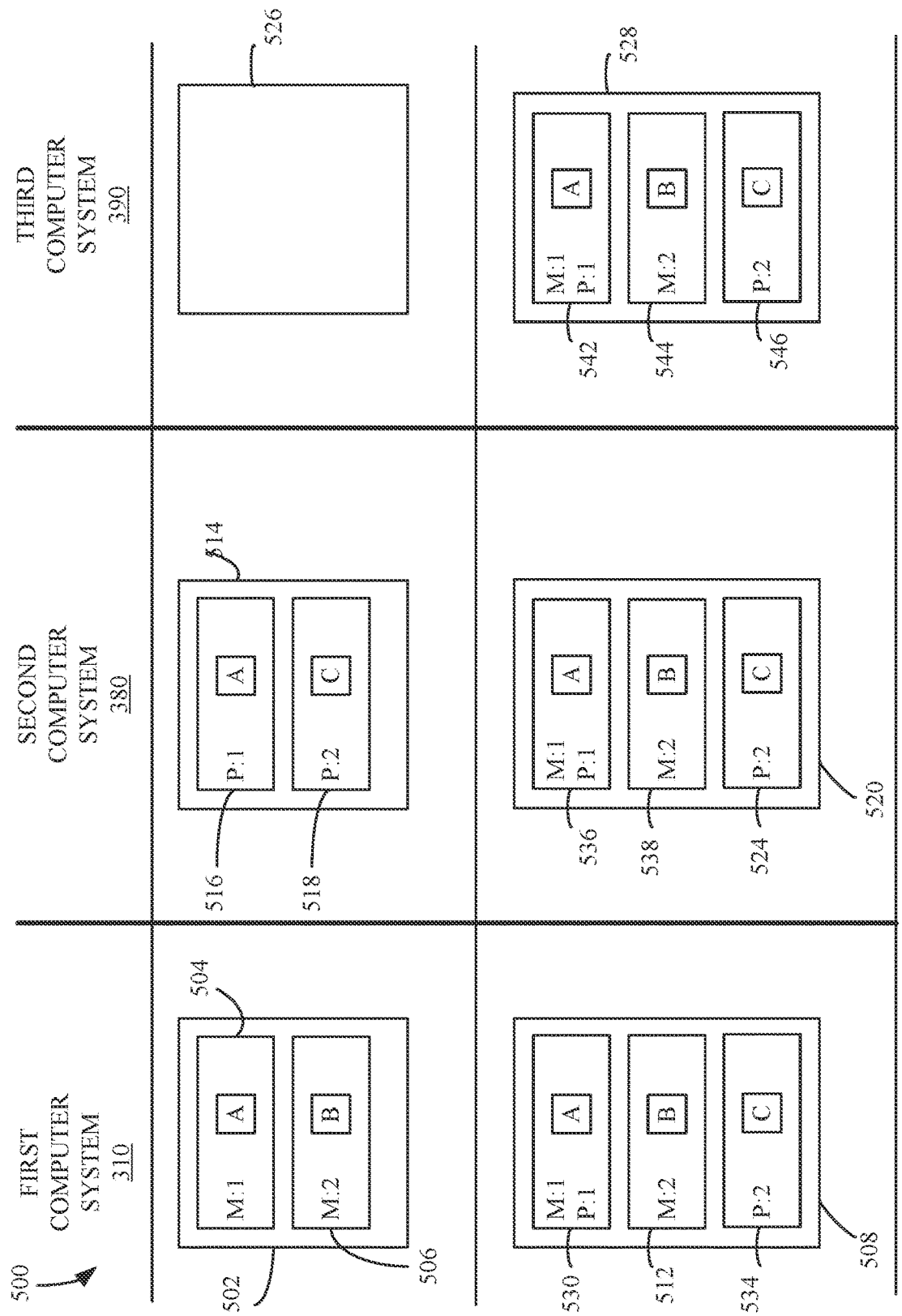

FIGS. 5A-5B are block diagrams illustrating a synchronization process (e.g., process 500) in accordance with some examples. It should be recognized that process 500 can include more, fewer, and/or different parts than illustrated in FIG. 5.

As illustrated in FIG. 5A, process 500 includes three different computer systems performing operations: first computer system 310, second computer system 380, and third computer 390. FIG. 5A is intended to show that the entire vertical below each computer system corresponds to that computer system. For example, first set of items 502 and first CRDT 508 correspond to first computer system 310 while second set of items 514 and second CRDT 520 correspond to second computer system 380.

As illustrated in FIG. 5A, first computer system 310 has stored first set of items 502, including item A 504 and item B 506. In some examples, item A 504 includes a CRDT identifier of "M:1," with "M" being a replica identifier corresponding to first computer system 310 and "1" being a counter for item A 504. In some examples, item B 506 includes a CRDT identifier of "M:2," with "M" being a replica identifier corresponding to first computer system 310 and "2" being a counter for item B 506 (e.g., incrementing by 1 as compared to the counter for item A 504). In some examples, item A 504 and item B 506 are from different sources (e.g., first source 330 and second source 340, respectively). In other examples, item A 504 and item B 506 are from the same source (e.g., first source 330 or second source 340). As illustrated in FIG. 5A, second computer system 380 is storing second set of items 514, including item A 516 and item C 518. In some examples, item A 516 includes a CRDT identifier of "P:1," with "P" being a replica identifier corresponding to second computer system 380 and "1" being a counter for item A 516. In some examples, item C 518 includes a CRDT identifier of "P:2," with "P" being a replica identifier corresponding to second computer system 380 and "2" being a counter for item C 518 (e.g., incrementing by 1 as compared to the counter for item A 516). In some examples, item A 516 and item C 518 are from different sources (e.g., similar to as described above with respect to item A 504 and item B 506). In other examples, item A 516 and item C 518 and are from the same source. In some examples, item A 516 corresponds to item A 504 and is from the same type of source or a different type of source as item A 504. In some examples, a content portion (e.g., as described above) of item A 504 matches and/or is the same as a content portion of item A 516. In such examples, a meta content portion (e.g., as described above) of item A 504 and a meta content portion of item A 516 can match or not match. As illustrated in FIG. 5A, third computer system 390 is storing third set of items 526, which does not include any items at the time of FIG. 5A. It should be recognized that first computer system 310, second computer system 380, and/or third computer system 390 can store more, fewer, and/or different items than illustrated in FIG. 5A.

As illustrated in FIG. 5A, first computer system 310 includes a state vector (e.g., first CRDT 508) for items being synchronized with other devices, first CRDT 508 including first CRDT identifier 510 and second CRDT identifier 512. In some examples, first CRDT identifier 510 corresponds to item A 504, and second CRDT identifier 512 corresponds to item B 506. In some examples, first CRDT 508 includes a set of data corresponding to item A 504 and/or item B 512 (e.g., a content portion as described above) and/or a hash of the set of data. In some examples, first CRDT 508 does not include a meta content portion for item A 504 and/or item B 506 (e.g., the meta content portion is not synchronized with other computer systems). As illustrated in FIG. 5A, second computer system 380 includes a state vector (e.g., second CRDT 520) for items being synchronized with other devices, second CRDT 520 including third CRDT identifier 522 and fourth CRDT identifier 524. In some examples, third CRDT identifier 522 corresponds to item A 516, and fourth CRDT identifier 524 corresponds to item C 518. In some examples, second CRDT 520 includes a set of data corresponding to item A 504 and/or item C 518 (e.g., a content portion as described above) and/or a hash of the set of data. In some examples, second CRDT 520 does not include a meta content portion for item A 516 and/or item C 518 (e.g., the meta content portion is not synchronized with other computer systems). As illustrated in FIG. 5A, third computer system 390 includes a state vector (e.g., third CRDT 528) for items being synchronized with other devices, third CRDT 528 not including any CRDT identifiers at the time of FIG. 5A.

In some examples, process 500 begins with first computer system 310 and second computer system 380 communicating with respect to their respective CRDTs. For example, first computer system 310 can communicate with second computer system 380 that first computer system 310 is aware of and/or stores first CRDT identifier 510 and second CRDT identifier 512. Similarly, second computer system 380 can communicate with first computer system 310 that second computer system 380 is aware of and/or stores third CRDT identifier 522 and fourth CRDT identifier 524.

In some examples, in response to receiving one or more communications identifying third CRDT identifier 522 and fourth CRDT identifier 524, first computer system 310 determines whether second computer system 380 is not aware of any items that first computer system 310 is aware of (e.g., by comparing CRDT identifiers). For example, item A 516 (e.g., represented by third CRDT identifier 522) can be matched with item A 504, causing first computer system 310 to determine that first computer system 310 is synchronized with second computer system 380 with respect to item A 504 and item A 516. For another example, item B 506 (represented by second CRDT identifier 512) might not have a match with CRDT identifiers received from second computer system 380. In such an example, first computer system 310 can generate a list of missing CRDT identifiers (e.g., second CRDT identifier 512) and send a message including the list of missing CRDT identifiers and their corresponding hashes of content portions (e.g., a content hash for item B 506). In some examples, second computer system 380 receives the message and determines whether second computer system 380 has another item with the same content hash as included in the message. In some examples, when second computer system 380 has another item with the same content hash as included in the message, second computer system 380 updates information regarding a connection between the item known by second computer system 380 and the item corresponding to the message. In such examples, first computer system 310 and second computer system 380 do not need to exchange the actual items as they have determined they are synchronized by comparing content hashes. In some examples, when second computer system 380 does not have another item with the same content hash as included in the message, second computer system 380 stores information related the item (e.g., second CRDT identifier 512) and/or requests information related to the item (e.g., a content portion and/or other information related to the item) from first computer system 310. In such examples, first computer system 310 can respond to second computer system 380 with a content message including second CRDT identifier 512, a content portion corresponding to second CRDT identifier 512, and/or any deletion information related to second CRDT identifier 512 with respect to a computer system being synchronized. In some examples, the content message and/or another message includes a meta data portion corresponding to second CRDT identifier 512. In other examples, the meta data portion corresponding to second CRDT identifier 512 is not provided to second computer system 380.

Similar operations as described above with respect to second CRDT identifier 512 can occur with respect to fourth CRDT identifier 524 so that first computer system 310 can be aware of item C 518. In some examples, a result of first computer system 310 and second computer system 380 synchronizing first CRDT 508 and second CRDT 520 is illustrated in FIG. 5B, with (1) first CRDT 508 of first computer system 310 including CRDT identifier 530 (e.g., including "M:1" and "P:1" to represent that first computer system 310 and second computer system 380 include item A (e.g., item A 504 and item A 516)), CRDT identifier 512 (e.g., including "M:2" to represent that first computer system 310 includes item B (e.g., item B 506)), and CRDT identifier 534 (including "P:2" to represent that second computer system 380 includes item C (e.g., item B 518)) and (2) second CRDT of second computer system 380 including corresponding (e.g., the same and/or equivalent) CRDT identifiers as first computer system 310 (e.g., CRDT identifier 536 corresponds to CRDT identifier 530, CRDT identifier 538 corresponds to CRDT identifier 532, and CRDT identifier 524 corresponds to CRDT identifier 534).

Referring back to FIG. 5A, first computer system 310 and/or second computer system 380 can perform the same operations with respect to third computer system 390 as described above between first computer system 310 and second computer system 380. In some examples, because third computer system 390 does not include any items, a result of synchronizing with first computer system 310 or second computer system 380 can result in third computer system 390 having third CRDT 528 as illustrated in FIG. 5B, which is the same as first CRDT 508 and second CRDT 820 as illustrated in FIG. 5B. In some examples, after third computer system 390 synchronizes with first computer system 310 or second computer system 380, a synchronization process (e.g., the operations described above with respect to synchronizing between first computer system 310 or second computer system 380) with a remaining computer system can include no transfer of CRDT hashes and/or content portions as a result of third computer system 390 receiving such information in synchronization with the other computer system.

While the discussion above is related to synchronization, in some examples, the set daemon (e.g., set daemon 320) can also manage distribution of data on a device. For example, after receiving data from one or more sources and synchronizing the data with one or more other computer systems, the set daemon can provide information related to the data to consumers (e.g., first consumer 350 and/or second consumer 360). Examples of such information include a current state of an item (e.g., content portion and/or meta content portion) on first computer system 310, a difference between a state of an item known by a consumer and a current state of the item, a current state of items known by first computer system 310, and/or a list of computer systems that include an item corresponding to another item. In some examples, the set daemon provides the information as it is updated (and/or based on criteria defined by consumers) to consumers that are subscribed to the data. In other examples, the set daemon provides a set of one or more APIs for consumers to use to obtain the information.

In some examples, communications between the set daemon and a consumer (e.g., first consumer 350 and/or second consumer 360) use a data structure referred to as a bookmark. For example, the set daemon sends a bookmark when communicating data to a consumer (e.g., the bookmark includes references to all items being sent to the consumer) so the consumer can respond with the bookmark when requesting an update. In some examples, the bookmark is a state vector including a state of one or more items.

The next four paragraphs provide an example of a schema for a CRDT. As provided, the schema for the CRDT includes a reference for each device and what items are stored on that device (e.g., an insertions dictionary with "uuid" for a device and a rangeset of counters for items stored on the device, and a deletions dictionary with "uuid" for a device and a rangeset of counters for items no longer stored on the device) and a reference to items that are included in at least one other computer system in a synchronization group.

```
CRDTStateVector {
    Insertions: Dict<uuid, rangeset>
    Deletions: Dict<uuid, rangeset>
}
```

Using the schema for the CRDT above, FIG. 5A would result in first computer system 510 including an insertions dictionary of {M: [1-2]} and second computer system 580 including an insertions dictionary of {P: [1-2]}. Similarly, FIG. 5B would result in first computer system 510, second computer system 580, and third computer system 590 including an insertions dictionary of {M: [1-2], P: [1-2]}.

The next four paragraphs provide an example of a schema for a state vector for a local copy of meta content. The schema for the state vector includes a reference for each meta content stored on that device (e.g., an insertions dictionary with a rangeset of counters for meta content stored on the device, and a deletions dictionary with a rangeset of counters for meta content no longer stored on the device).

```
RangeSets {
    Insertions: rangeset,
    Deletions: rangeset,
}
```

Using the schema for the state vector for the local copy of meta content above, FIG. 5A would result in first computer system 510 including an insertions dictionary of {[1-2]} (e.g., corresponding to item A 504 and item B 506) and second computer system 580 including an insertions dictionary of {[1-2]} (e.g., corresponding to item A 516 and item C 518). Similarly, FIG. 5B would result in first computer system 510 still including an insertions dictionary of {[1-2]} (e.g., corresponding to item A 504 and item B 506), and second computer system 580 still including an insertions dictionary of {[1-2]} (e.g., corresponding to item A 516 and item C 518).

The next four paragraphs provide an example of a schema for a bookmark. The schema for the bookmark includes a reference to a CRDT state vector as described above and a reference to a state vector for a local copy of meta content as described above.

```
Bookmark {
    content_sv: CRDTStateVector,
    meta_content_sv: RangeSet,
}
```

Figure 6:
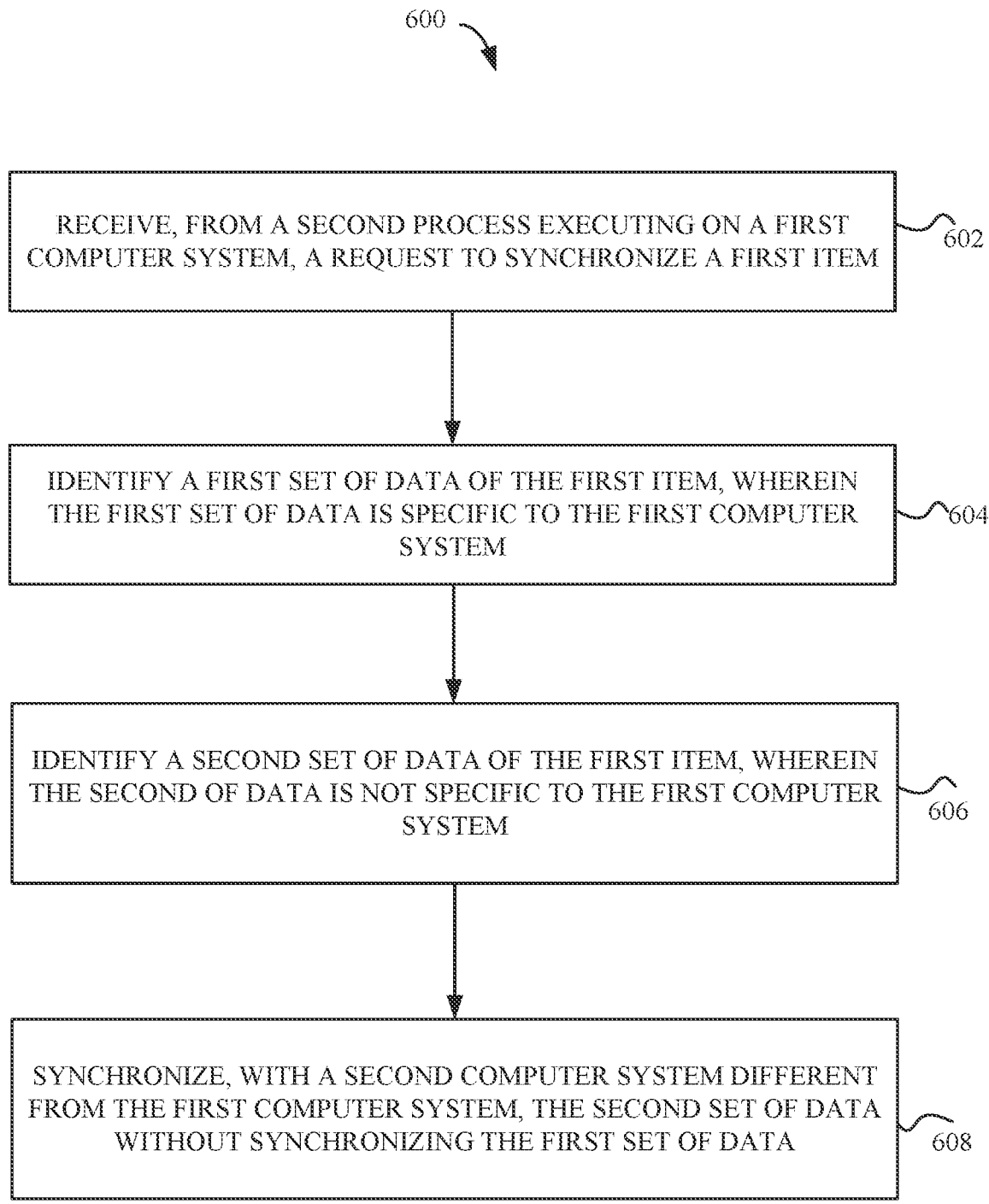
FIG. 6 is a flow diagram illustrating a method for synchronizing data in accordance with some examples.

FIG. 6 is a flow diagram illustrating a method (e.g., method 600) for synchronizing data in accordance with some examples. Some operations in method 600 are, optionally, combined, the orders of some operations are, optionally, changed, and some operations are, optionally, omitted.

In some examples, method 600 is for synchronizing device-agnostic data for an item while locally maintaining device-specific data for the item. In some examples, method 600 is performed at a first process (e.g., 320) (e.g., a daemon, a differential set engine, a synchronization process, a data management process, an entity management process, and/or a distributed set process) executing on a first computer system (e.g., 310) (e.g., a user device, a personal device, a multi-user device, and/or a device). In some examples, the first computer system is a smart phone, a smart watch, a fitness tracking device, a wearable device, a head-mounted display (HMD) device, a tablet, a laptop, a desktop, and/or a personal computer system.

At 602, the first process receives, from a second process (e.g., 330 and/or 340) (e.g., corresponding to an application, such as a calendar application, a music application, a podcast application, and/or a contacts application) (e.g., a client application that is sending data to the first process to synchronize with other devices and/or computer systems) executing on the first computer system, a request to synchronize (e.g., with one or more other devices, such as devices logged into the same user account) a first item (e.g., 410) (e.g., a set of data, such as a contact in a phone, a calendar event, information related to an accessory device, information related to a media item, and/or a note). In some examples, the request to synchronize the first item includes the first item. In some examples, the second process receives the first item before or after receiving the request to synchronize the first item. In some examples, the second process accesses the first item in response to receiving the request to synchronize the first item. In some examples, the first item includes time-series data. In some examples, the first item includes data corresponding to a single entity (e.g., a contact, a calendar meeting, a song, a movie, and/or a media item). In some examples, the request to synchronize the first item is with respect to computer systems logged into the same user account as the first computer system.

At 604, the first process identifies a first set of data (e.g., 430) (e.g., meta content, one or more fields of data, and/or one or more separate portions of data) of the first item, wherein the first set of data is specific to the first computer system (e.g., one or more identifiers used by the first computer system to identify the first item). In some examples, data (e.g., fields and/or portions of the first set of data) specific to the first computer system is defined by the second process. In some examples, the first set of data is generated by the second process. In some examples, the first set of data is identified in response to receiving the request to synchronize the first item. In some examples, the first set of data includes an identifier used by the first computer system to identify the first item.

At 606, the first process identifies a second set of data (e.g., 420) (e.g., content, one or more fields of data, and/or one or more separate portions of data) of the first item, wherein the second of data is not specific (e.g., is agnostic) to the first computer system (e.g., the second set of data is specific to the second process and/or an application corresponding to the second process, such as one or more identifiers used by the second process and/or the application to identify the first item), and wherein the second set of data is different from the first set of data. In some examples, data (e.g., fields and/or portions of the first set of data) not specific to the first computer system is defined by the second process. In some examples, the second set of data is generated by the second process. In some examples, the second set of data is identified in response to receiving the request to synchronize the first item. In some examples, the second set of data includes an identifier used by an application (e.g., an application available on the first computer system and/or the second computer system) to identify the first item.

At 608, the first process synchronizes, with a second computer system (e.g., 380) (e.g., a user device, a personal device, a multi-user device, and/or a device) different from the first computer system, the second set of data without synchronizing the first set of data. In some examples, the second computer system is a smart phone, a smart watch, a fitness tracking device, a wearable device, a head-mounted display (HMD) device, a tablet, a laptop, a desktop, and/or a personal computer system. In some examples, the second computer system is logged into the same user account as the first computer system.

In some examples, synchronizing the second set of data occurs in response to receiving, from the second computer system, a state vector (e.g., 508, 520, and/or 528) (e.g., a Conflict-Free Replicated Data Type) that does not include an identifier of the second set of data. In some examples, the state vector includes a list of shared items known by the second computer system. In some examples, the state vector includes a first data structure (e.g., a dictionary) for insertions of items and a second data structure (e.g., a dictionary) for deletions of items. In some examples, the first data structure includes a list of UUIDs (e.g., corresponding to different computer systems) and/or a range of clock values for each UUID in the list of UUIDs. In some examples, each clock value for a UUID refers to when an item was received. For example, an initial item can have a clock value of 0 while an item directly after the initial item can have a clock value of 1. In some examples, the second data structure includes a list of UUIDs (e.g., corresponding to different computer system) and/or a range of clock values for each UUID in the list of UUIDs. In some examples, in response to receiving the state vector, the first process (1) identifies one or more CRDT identifiers (e.g., 512 in FIG. 5A) that are not known by the second computer system and (2) generates a pairing of CRDT identifiers to hashed data packets (e.g., a hash of data, such as the hash of the second set of data described above). In some examples, a CRDT identifier (e.g., 510, 512, 522, and/or 524) is used for a state vector for synchronization. In some examples, a CRDT identifier includes a replica identifier (e.g., a UUID corresponding to a computer system, a process, and/or an application) and a clock value (e.g., a monotonic logical clock value) (e.g., as described above). In some examples, in the case that the second set of data is being synchronized (e.g., the identifier of the second set of data is not included in the state vector), the first process identifies a CRDT identifier corresponding to the second set of data and sends, to the second computer system, a pairing of (1) the CRDT identifier corresponding to the second set of data and (2) a hash of the second set of data. In some examples, in response to receiving the pairing, the second computer system determines whether the second computer system has the hash of the second set of data. In some examples, in accordance with a determination that the second computer system does not have the hash of the second set of data, the second computer system requests, from the first process, data (e.g., the second set of data) corresponding to the hash.

In some examples, synchronizing the second set of data includes sending, to the second computer system, a hash of the second set of data. In some examples, the hash of the second set of data is used as an identifier of the second set of data to compare to identifiers stored by the second computer system to determine whether the second computer system has a corresponding set of data as part of synchronizing the second set of data with another computer system. In some examples, after sending the hash of the second set of data, the first process receives, from the second computer system, a request for the second set of data. In some examples, in response to receiving the request for the second set of data, the first process sends, to the second computer system, a CRDT identifier and the second set of data.

In some examples, synchronizing the second set of data with the second computer system includes receiving (e.g., after sending, to the second computer system, the hash of the second set of data), from the second computer system, a request for the second set of data. In some examples, synchronizing the second set of data with the second computer system includes, in response to receiving the request for the second set of data, sending, to the second computer system, the second set of data.

In some examples, as part of synchronizing (and/or as part of synchronizing the second set of data and/or one or more other sets of data) with the second computer system, the first process sends, to the second computer system, a state vector (e.g., 508 and/or 520) for synchronized items known by the first process. In some examples, the state vector for synchronized items known by the first process includes a first data structure (e.g., a dictionary) for insertions of items and a second data structure (e.g., a dictionary) for deletions of items. In some examples, the first data structure includes a list of UUIDs (e.g., corresponding to different computer systems) and/or a range of clock values for each UUID in the list of UUIDs. In some examples, the second data structure includes a list of UUIDs (e.g., corresponding to different computer system) and/or a range of clock values for each UUID in the list of UUIDs. In some examples, as part of synchronizing (and/or as part of synchronizing the second set of data and/or one or more other sets of data) with the second computer system, the first process receives, from the second computer system, one or more hash values. In some examples, each hash value of the one or more hash values corresponds to a different shared item. In some examples, as part of synchronizing (and/or as part of synchronizing the second set of data and/or one or more other sets of data) with the second computer system, in response to receiving the one or more hash values, and in accordance with a determination that a first hash value of the one or more hash values is not known by the first process, the first process sends a request for data corresponding to the first hash value. In some examples, the determination that the first hash value of the one or more hash values is not known by the first process means that the first process does not know about an item corresponding to the first hash value (e.g., has not received an indication of the item corresponding to the first hash value from another computer system). In some examples, as part of synchronizing (and/or as part of synchronizing the second set of data and/or one or more other sets of data) with the second computer system, in response to receiving the one or more hash values, and in accordance with a determination that a second hash value of the one or more hash values is known by the first process, the first process updates an object (e.g., an object including an indication of an item corresponding to the second hash value, one or more hash values corresponding to data of the item corresponding to the second hash value, and/or indications of one or more computer systems that include the item corresponding to the second hash value) corresponding to the second hash value to include a computer system (e.g., the second computer system or another computer system different from the first computer system and the second computer system) corresponding to the second hash value (e.g., without sending a request for data corresponding to the first hash value). In some examples, the determination that the second hash value of the one or more hash values is known by the first process means that the first process already knows about the item corresponding to the second hash value but that the first process does not know that a computer system corresponding to the second hash value has the item (e.g., the first process has not received an indication of the item corresponding to the second hash value from the computer system corresponding to the second hash value). In some examples, as part of synchronizing (and/or as part of synchronizing the second set of data and/or one or more other sets of data) with the second computer system and after sending the request for the data corresponding to the first hash value, the first process receives the data (e.g., a CRDT identifier (e.g., as described above) of an item corresponding to the first hash value, content of an item corresponding to the first hash value, and/or one or more deleted identifiers (e.g., indicating one or more computer systems that have deleted an item corresponding to the first hash value)) corresponding to the first hash value. In some examples, the first process maintains information related to items synchronized between computer system without maintaining data, in the items, that is specific to computer systems other than the first computer system. In some examples, a process corresponding to the first process on the second computer system maintains information related to items synchronized between computer system without maintaining data, in the items, that is specific to computer systems other than the second computer system.

In some examples, the first item is an item of a first type (e.g., calendar data, text data, call data, contacts data, image data, video data, media data, song data, accessory data, time-series data, event data, and/or email data). In some examples, the first process receives (e.g., from the second process (or, in some examples, a process different from the second process executing on the first computer system)) a request to synchronize (e.g., with one or more other devices, such as devices logged into the same user account) a second item (e.g., a set of data) of a second type different from the first type. In some examples, the request to synchronize the second item includes the second item. In some examples, the second process receives the second item before or after receiving the request to synchronize the second item. In some examples, the second process accesses the second item in response to receiving the request to synchronize the second item. In some examples, the second item includes time-series data. In some examples, the second item includes data corresponding to a single entity. In some examples, the request to synchronize the second item is with respect to computer systems logged into the same user account as the first computer system. In some examples, the second item is received from a process corresponding to a different type of application (e.g., an application to play media, store events, process documents, and/or communicate with others) than the second process. In some examples, the first process identifies a third set of data (e.g., meta content, one or more fields of data, and/or one or more separate portions of data) of the second item, wherein the third set of data is specific to the first computer system (e.g., one or more identifiers used by the first computer system to identify the second item). In some examples, the third set of data is identified in response to receiving the request to synchronize the second item. In some examples, the third set of data includes an identifier used by the first computer system to identify the second item. In some examples, the first process identifies a fourth set of data (e.g., content, one or more fields of data, and/or one or more separate portions of data) of the second item, wherein the fourth set of data is not specific (e.g., is agnostic) to the first computer system (e.g., the fourth set of data is specific to an application, such as one or more identifiers used by the application to identify the second item), and wherein the fourth set of data is different from the third set of data. In some examples, the fourth set of data is identified in response to receiving the request to synchronize the second item. In some examples, the fourth set of data includes an identifier used by an application (e.g., an application available on the first computer system and/or the second computer system) to identify the second item. In some examples, the first process synchronizes, with the second computer system, the fourth set of data without synchronizing the third set of data.

In some examples, the request to synchronize the second item is received from a third process (e.g., corresponding to an application, such as a calendar application, a music application, a podcast application, and/or a contacts application) (e.g., a client application that is sending data to the first process to synchronize with other devices and/or computer systems) executing on the first computer system. In some examples, the third process is different from the first process and the second process.

In some examples, after synchronizing the second set of data, the first process receives (e.g., via an application programming interface (API), an inter-process communication (IPC), and/or a system call that, in some examples, is provided by the first process), from a fourth process (e.g., 350 and/or 360) (e.g., a cross-application process, a digital assistant process, an integration process, a collection process, and/or a search process) (e.g., corresponding to an application, such as a calendar application, a music application, a podcast application, and/or a contacts application) (e.g., a client application that is consuming data via the first process to perform one or more operations) (e.g., a client application that is sending data to the first process to synchronize with other devices and/or computer systems) executing on the first computer system, a first request corresponding to the first item, wherein the fourth process is different from the first process. In some examples, the fourth process is the third process and/or the second process. In some examples, the fourth process is different from the second process. In some examples, the first request corresponding to the first item includes a first set of one or more state vectors (e.g., including an indication of the first item or not including an indication of the first item) (e.g., a first state vector corresponding to a synchronized portion of one or more items and a second state vector corresponding to a non-synchronized portion of one or more items), an object (e.g., corresponding to the first item), an identification of the first item, and/or an indication of the first item. In some examples, the first request corresponding to the first item includes a request for a difference between the first set of one or more state vectors and a second set of one or more state vectors stored by the first process as a representation of the first item and, in some examples, one or more other items. In some examples, in response to receiving the first request corresponding to the first item, the first process sends to the fourth process, a first state vector including an indication of the first set of data and a second state vector including an indication of the second set of data, wherein the second state vector is different from the first state vector. In some examples, the first state vector corresponds to the first set of data (e.g., indicating that the first request did not include an indication of the first set of data).

In some examples, after synchronizing the second set of data with the second computer system, the first process receives (e.g., via an application programming interface (API), an inter-process communication (IPC), and/or a system call that, in some examples, is provided by the first process), from a fifth process (e.g., 350 and/or 360) (e.g., a cross-application process, a digital assistant process, an integration process, a collection process, and/or a search process) (e.g., corresponding to an application, such as a calendar application, a music application, a podcast application, and/or a contacts application) (e.g., a client application that is consuming data via the first process to perform one or more operations) (e.g., a client application that is sending data to the first process to synchronize with other devices and/or computer systems) executing on the first computer system, a second request corresponding to the first item, wherein the fifth process is different from the first process. In some examples, the fifth process is the second process, the third process, and/or the fourth process. In some examples, the fifth process is different from the second process. In some examples, the second request corresponding to the first item includes a first set of one or more state vectors (e.g., including an indication of the first item) (e.g., a first state vector corresponding to a synchronized portion of one or more items and/or a second state vector corresponding to a non-synchronized portion of one or more items), an object (e.g., corresponding to the first item), an identification of the first item, and/or an indication of the first item. In some examples, the second request corresponding to the first item is received via a different API from the first request corresponding to the first item. In some examples, in response to receiving the second request corresponding to the first item and in accordance with a determination that the second computer system includes an item with data matching the second set of data (e.g., based on synchronization of the second set of data with the second computer system), the first process sends, to the fifth process, an indication of the first computer system and an indication of the second computer system (and/or one or more other indications of other computer systems that include an item with data matching the second set of data). In some examples, in accordance with a determination that the second computer system includes an item with data matching the second set of data, the item of the second computer system does not match the first item (e.g., the first item includes data specific to the first computer system that is different from data specific to the second computer system of the item of the second computer system). In some examples, in accordance with a determination that the second computer system includes an item with data matching the second set of data, the item of the second computer system matches the first item (e.g., same item). In some examples, in accordance with a determination that the second computer system includes an item with data matching the second set of data, the first item includes data not specific to the first computer system that matches data not specific to the second computer system of the item of the second computer system. In some examples, in response to receiving the second request corresponding to the first item and in accordance with a determination that the second computer system does not include an item with data matching the second set of data (e.g., based on synchronization of the second identifier with the second computer system), the first process sends, to the fifth process, the indication of the first computer system without the indication of the second computer system. In some examples, the indication of the first computer system includes a name corresponding to the first computer system. In some examples, the indication of the second computer system includes a name corresponding to the second computer system. In some examples, in accordance with a determination that the second computer system does not include an item with data matching the second set of data, the item of the second computer system does not match the first item (e.g., the first item includes data not specific to the first computer system that is different from data not specific to the second computer system of the item of the second computer system).

In some examples, after synchronizing the second set of data with the second computer system, the first process receives (e.g., via an application programming interface (API), an inter-process communication (IPC), and/or a system call that, in some examples, is provided by the first process), from a sixth process (e.g., 350 and/or 360) (e.g., a cross-application process, a digital assistant process, an integration process, a collection process, and/or a search process) (e.g., corresponding to an application, such as a calendar application, a music application, a podcast application, and/or a contacts application) (e.g., a client application that is consuming data via the first process to perform one or more operations) (e.g., a client application that is sending data to the first process to synchronize with other devices and/or computer systems) executing on the first computer system, a third request corresponding to the first item, wherein the sixth process is different from the first process. In some examples, the sixth process is the second process, the third process, the fourth process, and/or the fifth process. In some examples, the sixth process is different from the second process. In some examples, the third request corresponding to the first item includes a first set of one or more state vector (e.g., including an indication of the first item) (e.g., a first state vector corresponding to a synchronized portion of one or more items and/or a second state vector corresponding to a non-synchronized portion of one or more items), an object (e.g., corresponding to the first item), an identification of the first item, and/or an indication of the first item. In some examples, the third request corresponding to the first item is received via a different API from the first request corresponding to the first item and/or the second request corresponding to the first item. In some examples, in response to receiving the third request corresponding to the first item, the first process sends to the sixth process, the first set of data.

In some examples, after synchronizing the second set of data with the second computer system, the first process receives, from the second process, an indication of an update to the first item. In some examples, in response to receiving the indication of the update to the first item and in accordance with a determination that the update at least partially corresponds to data not specific to the first computer system, the first process updates the second set of data. In some examples, in response to receiving the indication of the update to the first item, the first process sends, to another process of the first computer system, an indication of the update to the first item. In some examples, the other process of the first computer system is configured to receive updates to the first item from the first process. In some examples, the other process of the first computer system is not configured to receive updates to the first item from the first process. In such examples, the other process of the first computer system sends, to the first process, a request for any updates to the first item. In some examples, in response to receiving the indication of the update to the first item, the first process updates the second set of data and/or the first set of data. In some examples, in response to receiving the indication of the update to the first item and in accordance with a determination that the update at least partially corresponds to data not specific to the first computer system, the first process synchronizes, with the second computer system, the updated second set of data without synchronizing data specific to the first computer system (e.g., data corresponding to the update that is specific to the first computer system). In some examples, in response to receiving the indication of the update to the first item and in accordance with a determination that the update at least partially corresponds to data specific to the first computer system, the first process updates the first set of data. In some examples, in response to receiving the indication of the update to the first item and in accordance with a determination that the update at least partially corresponds to data specific to the first computer system, the first process forgoes synchronizing, with the second computer system, the updated first set of data.

In some examples, after synchronizing the second set of data with the second computer system, the first process receives, from the second process, an indication of a current state of the first item. In some examples, the indication of the current state of the first item includes the first item at a point in time (e.g., after synchronizing the second set of data with the second computer system). In some examples, after (and/or in response to) receiving the current state of the first item, the first process compares the current state of the first item with a previous state of the first item. In some examples, the previous state of the first item is stored by the first process (e.g., based on a previous communication with the second process). In some examples, in response to comparing the current state of the first item with the previous state of the first item and in accordance with a determination that data of the first item not specific to the first computer system has been updated (e.g., added, removed, and/or changed), the first process updates the second set of data to generate an updated second set of data. In some examples, in response to comparing the current state of the first item with the previous state of the first item, the first process sends, to another process of the first computer system, an indication of an update to the first item. In some examples, the other process of the first computer system is configured to receive updates to the first item from the first process. In some examples, the other process of the first computer system is not configured to receive updates to the first item from the first process. In such examples, the other process of the first computer system sends, to the first process, a request for any updates to the first item. In some examples, the first process synchronizes, with the second computer system, the updated second set of data (e.g., data corresponding to the update that is not specific to the first computer system) without synchronizing data specific to the first computer system (e.g., data corresponding to the update that is specific to the first computer system). In some examples, in response to comparing the current state of the first item with the previous state of the first item and in accordance with a determination that data of the first item specific to the first computer system has been updated, the first process updates the first set of data to generate an updated first set of data. In some examples, the first process forgoes synchronizing, with the second computer system, the updated first set of data.

In some examples, one or more operations of method 600 are used on one or more devices (e.g., each device or a subset of devices) logged into the same user account and synchronization occurs such that each device of the one or more devices has (1) an indication of shared items for all items on all devices being synchronized and an indication of which other devices have particular shared items. In some examples, hashing the first set of data allows for quick comparisons of hashes to determine whether the first set of data has been updated. In some examples, hashing the second set of data allows for quick comparisons of hashes to determine whether the second set of data has been updated.

Note that details of the processes described above with respect to method 600 (e.g., FIG. 6) are also applicable in an analogous manner to other methods described herein. For example, method 800 optionally includes one or more of the characteristics of the various methods described above with reference to method 600. For example, the first event of method 800 can be the item, the first set of data, and/or the second set of data of method 600. For brevity, these details are not repeated below.

Attention is now directed to managing data to be available to be consumed. Some techniques described herein include incrementally updating a view of data. In some examples, the view (sometimes referred to as a materialized view) is stored in memory and/or storage in communication with a computer system and includes a result of one or more queries on a database. In such examples, generation of the view can be provided on top of a stream of data and outside of consumers requesting the data. For example, a daemon and/or service of a computer system can detect events occurring with respect to a data stream and, in response, identify one or more views requested for the data stream and cause such to be generated in an iterative fashion as additional events are detected without receiving requests from a consumer.

Figure 7A:
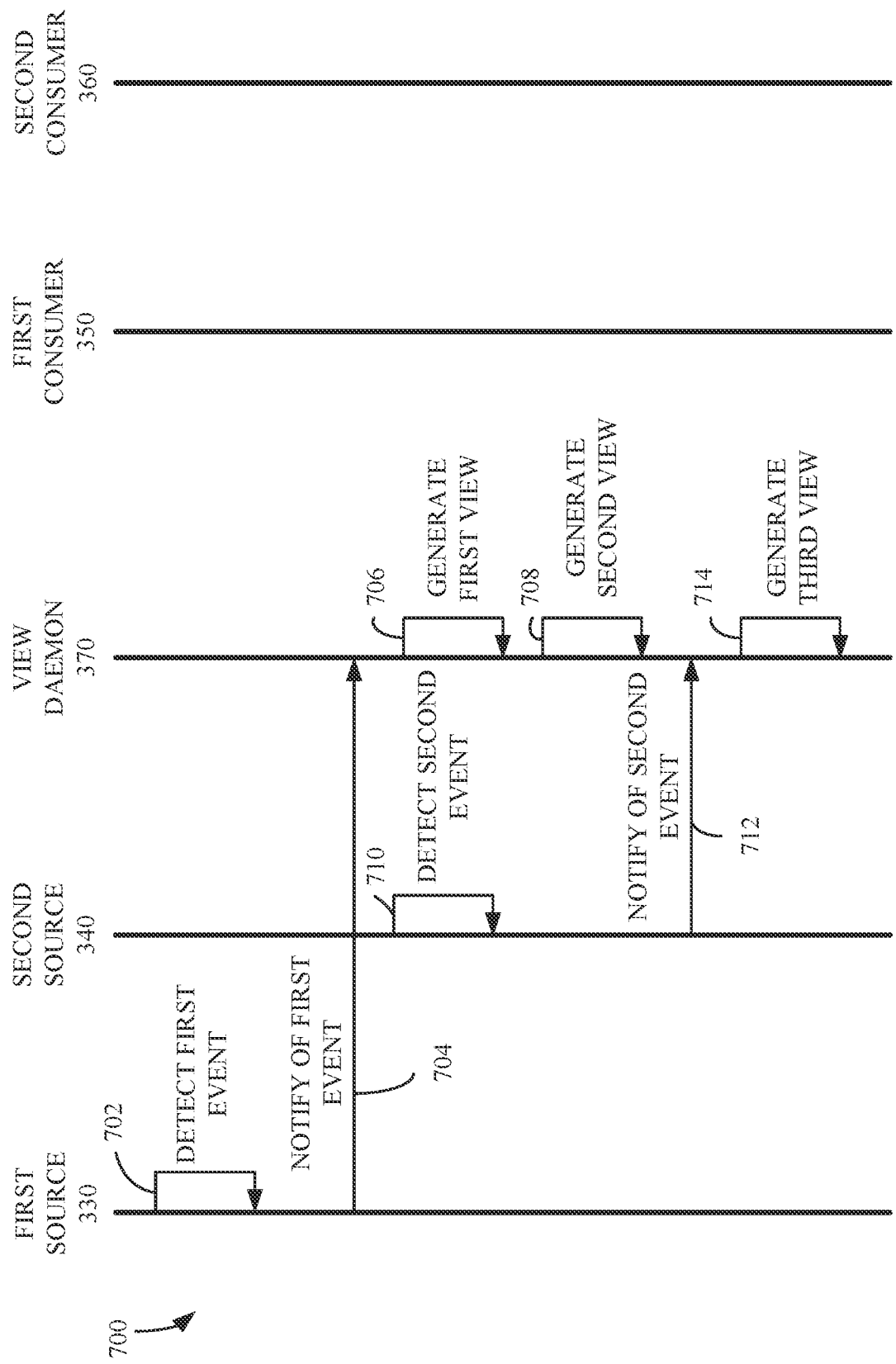
FIGS. 7A-7B are block diagrams illustrating a process to update views in accordance with some examples.
Figure 7B:
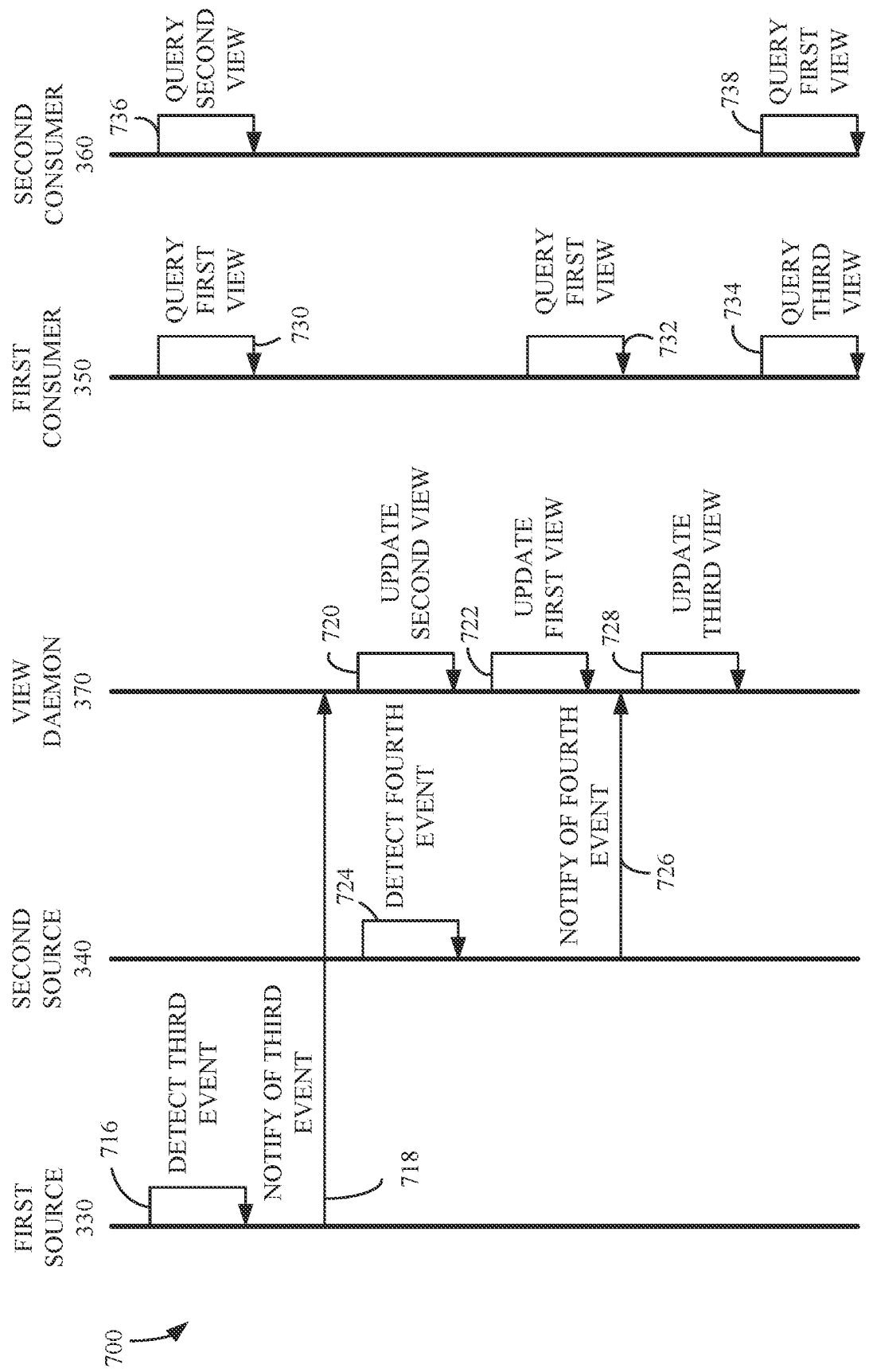

FIGS. 7A-7B are block diagrams illustrating a process (e.g., process 700) to update views in accordance with some examples. It should be recognized that process 700 can include more, fewer, and/or different parts than illustrated in FIG. 7.

As illustrated in FIG. 7A, process 700 includes five different components performing operations: first source 330, second source 340, view daemon 370, first consumer 350, and second consumer 360. It should be recognized that process 700 can be performed by more, fewer, and/or different components. For example, view daemon 370 can perform one or more operations illustrated for process 700 via a service, such as an IPC service.

In some examples, process 700 begins with view daemon 370 receiving a set of one or more queries (e.g., a database operation, such as a SQL query) to execute with respect to one or more streams of data. In such examples, the set of one or more queries can correspond to a single application (e.g., first consumer 350 or second consumer 360) executing on a computer system with view daemon 370. In some examples, the single application sends the set of one or more queries directly to view daemon 370. In other examples, a server and/or other computer system receives and, in some examples, validates the set of one or more queries and, after receiving and/or validating, sends the set of one or more queries to view daemon 370. In some examples, view daemon 370 receives other sets of one or more queries from other applications such that view daemon 370 manages sets of queries from multiple different applications. An example of a query includes a SQL statement to create a materialized view (e.g., a result that is stored on a device after running a query on a set of data) on the computer system using a filter of a column of another table.

In some examples, after receiving the set of one or more queries, view daemon 370 parses the set of one or more queries and generates a logical plan (e.g., a plan for how to perform the one or more queries in an iterative manner) to complete the set of one or more queries. In such examples, after generating the logical plan, view daemon 370 generates a physical plan (sometimes referred to herein as a storage plan) that includes code and/or a set of operations to be performed to implement the logical plan. For example, the physical plan can include an instruction to execute a SQL operation to create a materialized view using one or more different sources (e.g., first source 330, second source 340, and/or another view). In other examples, view daemon 370 generates the physical plan from the set of one or more queries, and a logical plan is not generated. In some examples, the physical plan is based on different sets of queries from different consumers. For example, two consumers can have the same or similar queries that are combined together in a single view. In other examples, a different physical plan is provided for each set of queries such that a different view is created for each set of queries and a single view would not correspond to more than one consumer.

At 702, first source 330 detects a first event. In some examples, the first event occurs with respect to a stream of data and includes a set of data that was posted to the stream of data. For example, the stream of data can correspond to updates to contacts in an address book such that the addition and/or update of a contact causes the update to be posted to the stream of data. For another example, the stream of data can correspond to when a device is plugged into a power source such that, when the device is plugged into or out of (e.g., connection with) the power source, an event indicating such is posted to the stream of data. It should be recognized that other types of events, data, and/or streams of data can be used with techniques described herein.

At 704, first source 330 notifies view daemon 370 of the first event. In some examples, such notification is performed in response to the first event occurring (e.g., in a push fashion) or in response to a request from view daemon 370 (e.g., in a pull fashion). In some examples, notifying view daemon 370 includes sending the first event and/or information related to the first event.

In some examples, after and/or in response to receiving the notification, view daemon 370 identifies one or more physical plans corresponding to the stream of data including the first event, first source 330, and/or the first event. In some examples, when updating a view and not generating a new view, view daemon 370 identifies a last position of the stream of data for which view daemon 370 has processed with respect to the one or more physical plans. For example, view daemon 370 can keep track of positions within data with respect to different physical plans so that view daemon 370 can incrementally process events that occur. In some examples, the last position includes an event and/or a file position and offset for which view daemon 370 last processed.

At 706, view daemon 370 generates (e.g., via an IPC service as described herein) a first view corresponding to the first event. In some examples, generating and/or updating the first view is based on and/or uses the one or more physical plans and/or the last position discussed above. For example, the first view can be generated according to a plan of the one or more physical plans, starting at wherever view daemon 370 last left off based on the last position. In some examples, view daemon 370 produces a set of inserts and/or deletes based on the plan and executes such with respect to the first view such that the first view is generated using the set of inserts and/or deletes relative to the stream of data. In some examples, such generating is performed in response to receiving the notification of the first event. For discussion purposes, 706 and 708 will be in the context of a new view that is generated and therefore does not have or use a last position.

At 708, view daemon 370 generates a second view different from the first view. In some examples, the second view corresponds to another plan of the one or more physical plans and is performed similar as described above with respect to the first view.

It should be recognized that, in some examples, multiple views are generated and/or updated in response to a single event. In such examples, view daemon 370 can determine an order to generate and/or update the views. In some examples, view daemon 370 determines the order based on dependencies between views and/or information known about one or more streams, one or more processes (e.g., a source and/or a consumer), and/or a computer system including view daemon 370. For example, if a stream depends on data from another stream, the other stream can be generated and/or updated before the stream. For another example, if a stream is determined to be less likely to be consumed than another stream, the other stream can be generated and/or updated before the stream. For another example, if a stream is determined to be updated more often than another stream, the other stream can be generated and/or updated before the stream and/or vice versa. For another example, if a stream is determined to be higher priority than another stream, the stream can be generated and/or updated before the stream. For another example, if a stream is set to update at a slower frequency than another stream, the other stream can be generated and/or updated before the stream even when the frequency is expired for the stream and the other stream and/or vice versa. For another example, if a computer system is charging and/or has battery charge that exceeds a threshold, a first view (e.g., a more resource-intensive view) can be generated and/or updated before another view (e.g., a less resource-intensive view) and/or vice versa. For another example, if a view corresponds to a first length of time while another view corresponds to a second length of time different from the first length of time, the view can be generated and/or updated before the other view based on the difference in length of time between the first length of time and the second length of time. For another example, if a consumer (e.g., first consumer 350 or second consumer 360) defines a time requirement for updates to a view, an estimate can be computed to perform different amounts of updates and then generating and/or updating the view can wait until the estimate is within a threshold of the time requirement. It should be recognized that logic in the different examples above can be combined and/or modified. In some examples, scheduling generation and/or update of different views uses a directed acyclic graph (DAG). In such examples, the DAG can indicate which views to generate and/or update and in what order.

At 710, second source 340 detects a second event. In some examples, the second event occurs with respect to a stream of data and includes a set of data that was posted to the stream of data. In such examples, the stream of data and/or type of data corresponding to the second event can be different from the stream of data and/or type of data corresponding to the first event. In some examples, the stream of data and/or type of data corresponding to the second event can be the same stream of data and/or type of data corresponding to the first event.

At 712, second source 340 notifies view daemon 370 of the second event. In some examples, such notification is performed in response to the second event occurring (e.g., in a push fashion) or in response to a request from view daemon 370 (e.g., in a pull fashion). In some examples, notifying view daemon 370 includes sending the second event and/or information related to the second event.

In some examples, after and/or in response to receiving the notification, view daemon 370 identifies one or more physical plans corresponding to the stream of data including the second event, second source 330, and/or the second event. In some examples, view daemon 370 identifies a last position of the stream of data including the second event for which view daemon 370 has processed with respect to the one or more physical plans.

At 714, view daemon 370 generates (e.g., via an IPC service as described herein) a third view corresponding to the second event. In some examples, generating and/or updating the third view is based on and/or uses the one or more physical plans and/or the last position discussed above (e.g., with respect to the second event). In some examples, view daemon 370 produces a set of inserts and/or deletes based on the plan and executes such with respect to the third view such that the third view is generated using the set of inserts and/or deletes relative to the stream of data. In some examples, such generating is performed in response to receiving the notification of the second event.

Turning to FIG. 7B, at 716 and 718, first source 330 detects another event (e.g., a third event) and notifies view daemon 370. The third event can occur with respect to the same stream of data or a different stream of data that was discussed above with respect to 702 in FIG. 7A. In some examples, the notification of the third event is performed in response to the third event occurring (e.g., in a push fashion) or in response to a request from view daemon 370 (e.g., in a pull fashion). In some examples, notifying view daemon 370 includes sending the third event and/or information related to the third event.

In some examples, after and/or in response to receiving the notification, view daemon 370 identifies one or more physical plans corresponding to the stream of data including the third event, first source 323, and/or the third event. In such examples, each of the one or more physical plans can correspond to a different set of queries provided by a different consumer. In some examples, the one or more physical plans are the same one or more physical plans identified above with respect to the first event. In such examples, view daemon 370 also identifies a last position of the stream of data including the third event for which view daemon 370 has processed with respect to the one or more physical plans. For example, as view daemon 370 generated first view and second view previously with respect to the first event, view daemon 370 can determine that events occurring after the first event should be processed with respect to the one or more physical plans (e.g., the third event and not the second event (e.g., because it is not part of a plan corresponding to the third event) or the first event).

At 720, view daemon 370 updates (e.g., via an IPC service as described herein) the second view before updating the second view. In some examples, such scheduling is based on one or more criteria described herein. For example, while the first view was generated and/or updated first with respect to 706 and 708, a current context of a computer system including view daemon 370 can result in the second view being updated before the first view. At 722, view daemon 370 updates (e.g., via an IPC service as described herein) the first view after updating the second view.

At 724 and 726, second source 340 detects another event (e.g., a fourth event) and notifies view daemon 370. Similar to above, the fourth event can occur with respect to the same stream of data or a different stream of data that was discussed above with respect to 710 in FIG. 7A. In some examples, the notification of the fourth event is performed in response to the fourth event occurring (e.g., in a push fashion) or in response to a request from view daemon 370 (e.g., in a pull fashion). In some examples, notifying view daemon 370 includes sending the fourth event and/or information related to the fourth event. At 728, view daemon 370 updates the third view similar to as described above with respect to 714.

As illustrated in FIG. 7B, alongside operations described above, first consumer 350 and second consumer 360 can query different views to consume data. For example, at 730, first consumer 350 queries the first view. In some examples, such query occurs after the first view was processed with respect to the first event but before the first view was processed with respect to the third event. In such examples, the query can result in data based on the first event but not based on the third event as view daemon 370 has not been notified of the third event at the time that first consumer 350 queried the first view.

At 732, first consumer 350 queries the first view again. In some examples, such query again occurs after the first view was processed with respect to the first event but before the first view was processed with respect to the third event (e.g., before the first view has been updated with respect to the third event). In such examples, the query can result in data based on the first event but not based on the third event as view daemon determined to update the second view before updating the first view. In some examples, the query at 732 is the same as or different from the query at 730.

At 734, first consumer 350 queries the third view. In some examples, such query occurs after the third view was processed with respect to both the second event and the fourth event. In such examples, the query can result in data based on the second event and the fourth event. Accordingly, first consumer 350, in some examples, is able to query different views that are being dynamically updated alongside and outside of any query by first consumer 350.

At 736, second consumer 360 queries the second view. In some examples, such query occurs after the second view was processed with respect to the first event but before the second view was processed with respect to the third event. In such examples, the query can result in data based on the first event and not based on the third event. Accordingly, second consumer 360, in some examples, is able to query different views than other consumers (e.g., first consumer 350).

At 738, second consumer 360 queries the first view. In some examples, such query is a different query than used by first consumer 350 at 730 and/or 732. In such examples, the query at 738 occurs after the first view was processed with respect to the first event and the third event. In such examples, the query can result in data based on the first event and the third event. Accordingly, second consumer 360, in some examples, is able to query the same views as other consumers (e.g., first consumer 350) but can use different queries when doing so.

Figure 8:
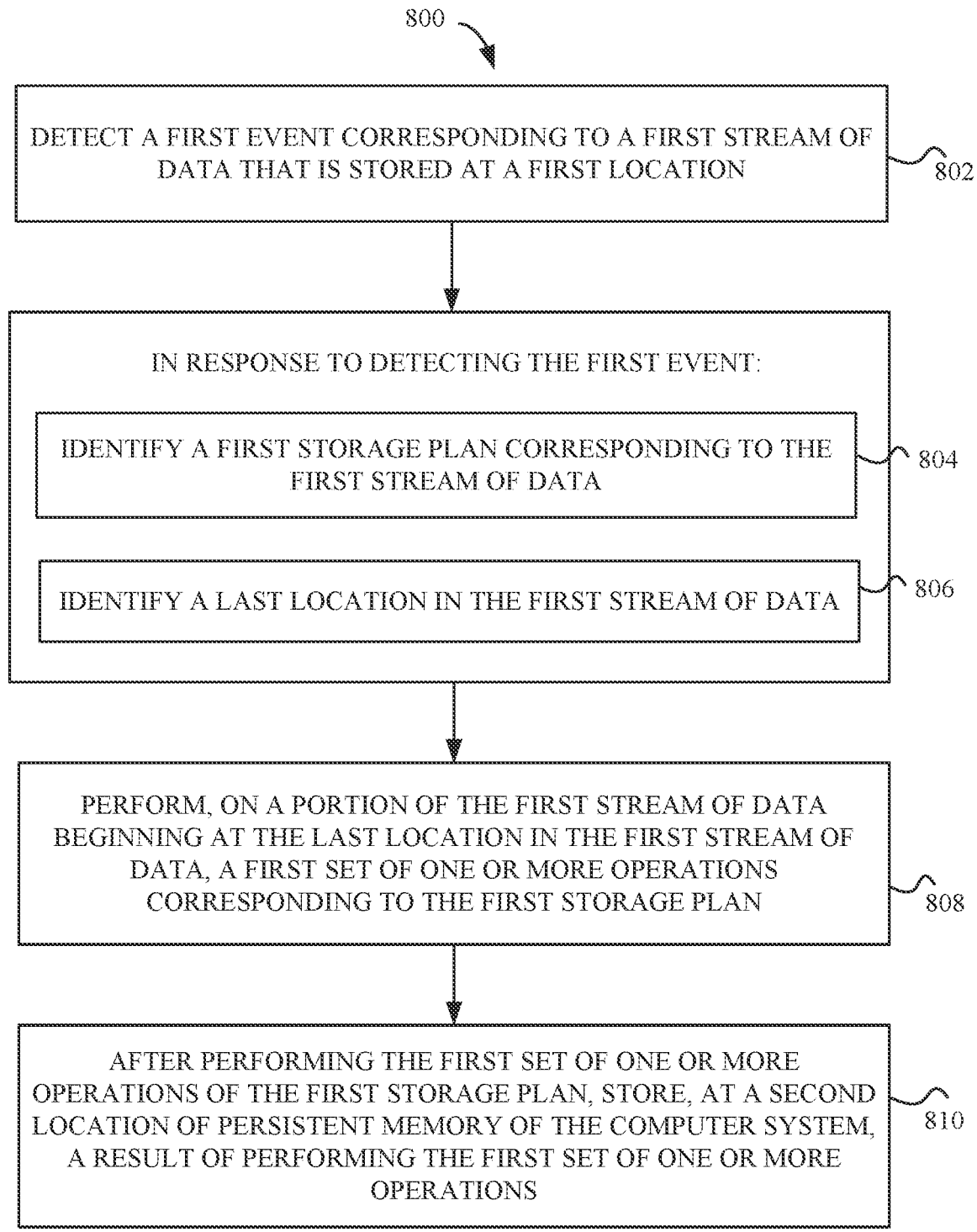
FIG. 8 is a flow diagram illustrating a method for incrementally updating data in accordance with some examples.

FIG. 8 is a flow diagram illustrating a method (e.g., method 800) for incrementally updating data in accordance with some examples. Some operations in method 800 are, optionally, combined, the orders of some operations are, optionally, changed, and some operations are, optionally, omitted.

In some examples, method 800 is performed at a daemon (e.g., as described above with respect to method 600) (and/or, in some examples, a service of a computer system in communication with the daemon) of a computer system (e.g., as described above with respect to method 600). In some examples, instead of the daemon, a user or system process of the computer system performs method 800. In some examples, the computer system is a smart phone, a smart watch, a fitness tracking device, a wearable device, a head-mounted display (HMD) device, a tablet, a laptop, a desktop, and/or a personal computer system.

At 802, the daemon detects a first event (e.g., a first set of data) corresponding to a first stream of data (e.g., the first set of data has been posted to the first stream of data) that is stored at a first location (e.g., of persistent or non-persistent memory). In some examples, the first stream of data includes sensor data (e.g., temperature, location, status of an input and/or output device, detection of a device being plugged into a portion of the computer system, and/or a power level of the computer system) detected by a sensor in communication with the computer system. In some examples, the first stream of data includes application and/or system data that is published by a process (e.g., a user process and/or a system process of the computer system) and/or an application of the computer system.

At 804, in response to detecting the first event, the daemon identifies a first storage plan (e.g., code and/or a list of one or more operations to be performed) corresponding to the first stream of data. In some examples, the first storage plan is specific to the first stream of data. In some examples, the first storage plan does not correspond to another stream of data different from the first stream of data. In some examples, the first storage plan is not specific to another stream of data different from the first stream of data.

At 806, in response to detecting the first event, the daemon identifies a last location (e.g., a previous and/or recent location) in the first stream of data. In some examples, the last location corresponds to a location in the first stream of data that the daemon has recently (e.g., most recently) accessed and/or processed.

At 808, in response to detecting the first event, the daemon performs (e.g., via a service, such as an IPC service executing on the computer system and in communication with the daemon), on a portion of the first stream of data beginning at the last location (e.g., and including the first event) in the first stream of data, a first set of one or more operations corresponding to the first storage plan. In some examples, the first set of one or more operations are defined in the storage plan.

At 810, after (e.g., after a predefined period of time and/or after and/or in response to performing one or more other sets of one or more operations corresponding to one or more other storage plans) (and/or in response to) performing the first set of one or more operations of the first storage plan, the daemon stores (e.g., directly stores and/or causes storage via the service of), at a second location of persistent memory of the computer system, a result of performing the first set of one or more operations, wherein the second location is different from the first location, and wherein the result is to be accessed by a user application of the computer system. In some examples, the result of performing the first set of one or more operations includes data not included in the first stream of data. In some examples, the result of performing the first set of one or more operations includes data (e.g., a portion of the first event) included in the first stream of data.

In some examples, after detecting the first event, the daemon detects a second event (e.g., a second set of data) corresponding to the first stream of data. In some examples, the second event is the same type of event as the first event. In some examples, the second event is a different type of event than the first event. In some examples, the second event corresponds to the same type of data as the first event. In some examples, the second event corresponds to a different type of data than the first event. In some examples, in response to detecting the second event, the daemon identifies a second storage plan (e.g., the first storage plan or another storage plan different from the first storage plan) corresponding to the first stream of data. In some examples, in response to detecting the second event, the daemon identifies an updated last location in the first stream of data, wherein the updated last location is different from the last location. In some examples, the updated last location corresponds to the first event and/or the second event such that the second event is processed and not the first event (e.g., incremental processing such that past events that have already been processed are not processed again). In some examples, in response to detecting the second event, the daemon performs, on a second portion of the first stream of data beginning at the updated last location (e.g., and including the second event and not including the first event) in the first stream of data, a second set of one or more operations corresponding to the second storage plan, wherein the second portion is different from the portion. In some examples, the second set of one or more operations is the same as the first set of one or more operations. In some examples, the second set of one or more operations is different from the first set of one or more operations. In some examples, after (e.g., after a predefined period of time and/or after and/or in response to performing one or more other sets of one or more operations corresponding to one or more other storage plans) (and/or in response to) performing the second set of one or more operations of the second storage plan, the daemon stores, at the second location of persistent memory of the computer system, a result of performing the second set of one or more operations. In some examples, the result of performing the second set of one or more operations replaces at least a portion of the result of performing the first set of one or more operations. In some examples, the result of performing the second set of one or more operations is stored with (e.g., does not replace at least a portion of) the result of performing the first set of one or more operations. In some examples, the result of performing the second set of one or more operations includes data not included in the first stream of data and/or the result of performing the first set of one or more operations. In some examples, the result of performing the second set of one or more operations includes data (e.g., a portion of the first event and/or a portion of the result of performing the first set of one or more operations) included in the first stream of data and/or the result of performing the first set of one or more operations.

In some examples, in response to detecting the first event, the daemon identifies a third storage plan (e.g., the second storage plan or another storage plan different from the second storage plan) corresponding to the first stream of data. In some examples, the third storage plan is different from the first storage plan (e.g., multiple storage plans are identified in response to detecting the first event). In some examples, a last location is identified for each storage plan (e.g., because each storage plan might not be performed in response to each new event being detected and some might have left off at different locations). In some examples, the last location identified for the first storage plan applies to other storage plans identified in response to detecting the first event (e.g., because the same storage plans are used when new events are detected for a particular stream of data). In some examples, in response to detecting the first event, the daemon performs, on a third portion (e.g., the first portion or another portion different from the first portion) of the first stream of data (e.g., beginning at the last location (e.g., and including the first event)), a third set of one or more operations corresponding to the third storage plan. In some examples, the third portion includes the first event. In some examples, the third set of one or more operations is the same as the first set of one or more operations. In some examples, the third set of one or more operations is different from the first set of one or more operations. In some examples, after (e.g., after a predefined period of time and/or after and/or in response to performing one or more other sets of one or more operations corresponding to one or more other storage plans) (and/or in response to) performing the third set of one or more operations of the third storage plan, the daemon stores, at a third location of persistent memory of the computer system, a result of performing the third set of one or more operations, wherein the third location is different from the first location. In some examples, the result of performing the third set of one or more operations includes data not included in the first stream of data and/or the result of performing the first set of one or more operations. In some examples, the result of performing the third set of one or more operations includes data (e.g., a portion of the first event and/or a portion of the result of performing the first set of one or more operations) included in the first stream of data and/or the result of performing the first set of one or more operations.

In some examples, after detecting the first event, the daemon detects a third event (e.g., a third set of data) corresponding to a second stream of data different from the first stream of data. In some examples, the third event is the same type of event as the first event. In some examples, the third event is a different type of event than the first event. In some examples, the third event corresponds to the same type of data as the first event. In some examples, the third event corresponds to a different type of data than the first event. In some examples, in response to detecting the third event, the daemon identifies a fourth storage plan (e.g., the first storage plan or another storage plan different from the first storage plan) corresponding to the second stream of data. In some examples, in response to detecting the third event, the daemon identifies a last location in the second stream of data. In some examples, the last location in the second stream of data corresponds to a location in the second stream of data that the daemon has recently (e.g., most recently) accessed and/or processed. In some examples, in response to detecting the third event, the daemon performs, on a fourth portion of the second stream of data (e.g., the fourth portion is different from the first portion) beginning at the last location (e.g., and including the third event) in the second stream of data, a fourth set of one or more operations corresponding to the fourth storage plan. In some examples, the fourth set of one or more operations is the same as the first set of one or more operations. In some examples, the fourth set of one or more operations is different from the first set of one or more operations. In some examples, after (e.g., after a predefined period of time and/or after and/or in response to performing one or more other sets of one or more operations corresponding to one or more other storage plans) (and/or in response to) performing the fourth set of one or more operations of the fourth storage plan, the daemon stores, at a fourth location of persistent memory of the computer system, a result of performing the fourth set of one or more operations, wherein the fourth location is different from the first location and the second location (and, in some examples, the third location). In some examples, the result of performing the fourth set of one or more operations includes data not included in the second stream of data and/or the result of performing the first set of one or more operations. In some examples, the result of performing the fourth set of one or more operations includes data (e.g., a portion of the third event) included in the second stream of data.

In some examples, after detecting the first event, the daemon detects a fourth event (e.g., a fourth set of data) corresponding to a third stream of data different from the first stream of data. In some examples, the fourth event is the same type of event as the first event. In some examples, the fourth event is a different type of event than the first event. In some examples, the fourth event corresponds to the same type of data as the first event. In some examples, the fourth event corresponds to a different type of data than the first event. In some examples, in response to detecting the fourth event, the daemon identifies a fifth storage plan (e.g., the first storage plan or another storage plan different from the first storage plan) corresponding to the third stream of data. In some examples, in response to detecting the fourth event, the daemon performs, on a fourth portion of the third stream of data (e.g., the fourth portion is different from the first portion) without identifying (and/or using) a last location in the fourth stream of data (e.g., because the third stream of data has not been previously processed using one or more techniques described herein (e.g., an event has not been used to generate a view corresponding to the third stream of data)), a fifth set of one or more operations corresponding to the fifth storage plan. In some examples, the fifth set of one or more operations is the same as the first set of one or more operations. In some examples, the fifth set of one or more operations is different from the first set of one or more operations. In some examples, after (e.g., after a predefined period of time and/or after and/or in response to performing one or more other sets of one or more operations corresponding to one or more other storage plans) (and/or in response to) performing the fifth set of one or more operations of the fifth storage plan, the daemon stores, at a fifth location of persistent memory of the computer system, a result of performing the fifth set of one or more operations, wherein the fifth location is different from the first location and the second location (and, in some examples, the third location and/or the fourth location). In some examples, the result of performing the fifth set of one or more operations includes data not included in the third stream of data and/or the result of performing the first set of one or more operations. In some examples, the result of performing the fifth set of one or more operations includes data (e.g., a portion of the fourth event) included in the third stream of data.

In some examples, the first set of one or more operations includes a database query operation (e.g., a SQL operation, such as an arithmetic operator, a comparison operator, and/or a logical operator, and/or a SQL statement). In some examples, the database query operation does not include an action query, such as an insertion, update, deletion, and/or other forms of data manipulation, to the first stream of data.

In some examples, the first storage plan includes a request to create a materialized view (e.g., a database object that includes a result of a query) (e.g., a local copy) (e.g., a replica of a stream of data from a single point in time) (e.g., a virtual table) (e.g., of the result of the first set of one or more operations). In some examples, the request causes the result of the first set of one or more operations to be stored at the second location of persistent memory of the computer system.

In some examples, before detecting the first event, the daemon receives a list of one or more database query operations. In some examples, in response to receiving the list of one or more database query operations, the daemon generates the first storage plan based on the list of one or more database query operations. In some examples, generating the first storage plan includes identifying a respective database query operation in the list of one or more database query operations, identifying an identifier of the first stream of data, and generating an instruction to perform the respective database query operation on the first stream of data.

In some examples, the result of performing the first set of one or more operations includes a set of differences (e.g., add and/or delete operations) that is applied to data at the second location (and/or the first location).

In some examples, the first set of operations is performed by a service accessed by the daemon via an interprocess communication (IPC).

Note that details of the processes described above with respect to method 800 (e.g., FIG. 8) are also applicable in an analogous manner to other methods described herein. For example, method 900 optionally includes one or more of the characteristics of the various methods described above with reference to method 800. For example, the first event of method 900 can be the first event of method 600. For brevity, these details are not repeated below.

Figure 9:
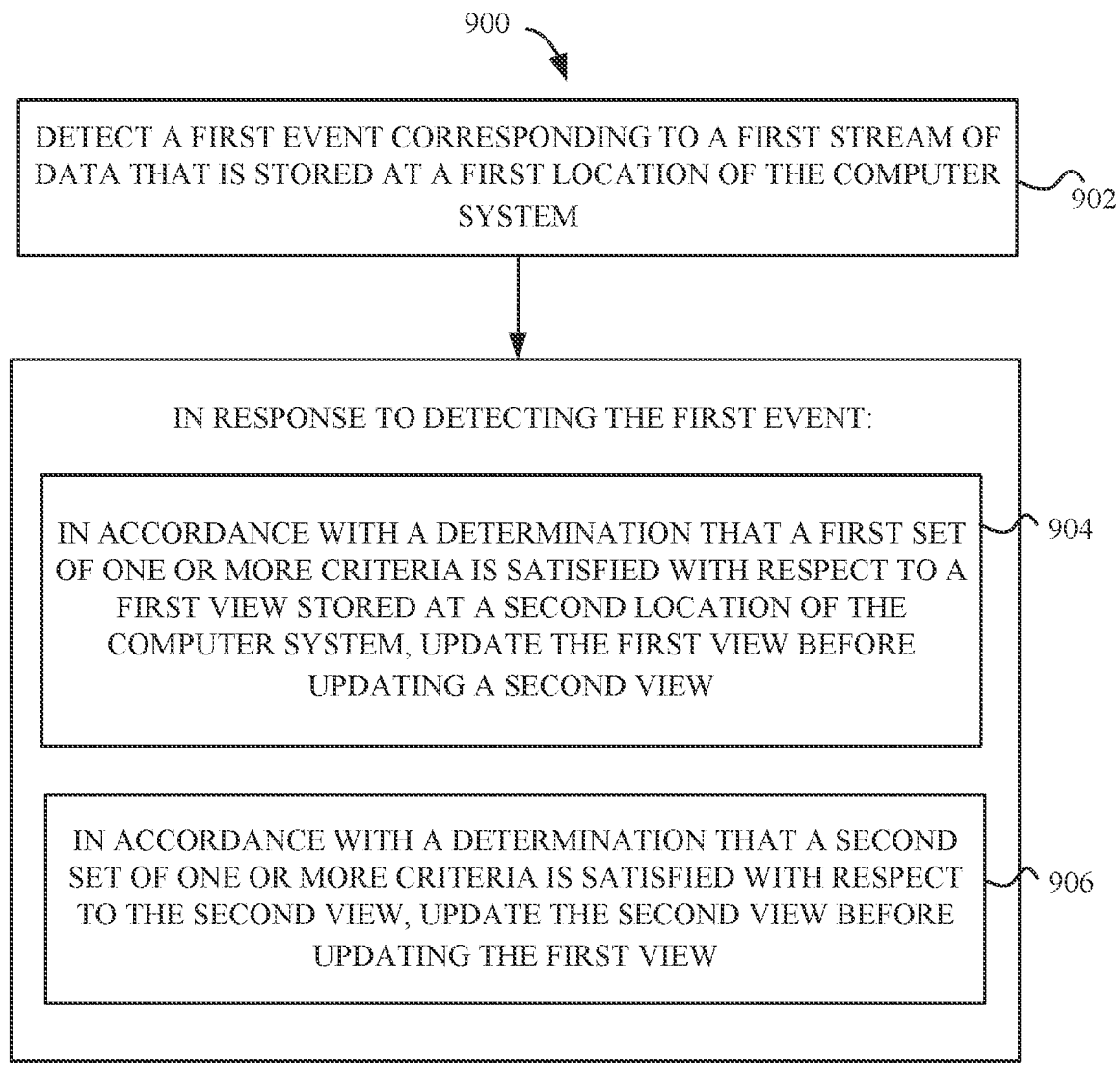
FIG. 9 is a flow diagram illustrating a method for scheduling updates of views in accordance with some examples.

FIG. 9 is a flow diagram illustrating a method (e.g., method 900) for scheduling updates of views in accordance with some examples. Some operations in method 900 are, optionally, combined, the orders of some operations are, optionally, changed, and some operations are, optionally, omitted.

In some examples, method 900 is performed at a daemon (e.g., as described above with respect to method 600) of a computer system (e.g., as described above with respect to method 600). In some examples, instead of the daemon, a user or system process of the computer system performs method 800. In some examples, the computer system is a smart phone, a smart watch, a fitness tracking device, a wearable device, a head-mounted display (HMD) device, a tablet, a laptop, a desktop, and/or a personal computer system.

At 902, the daemon detects a first event (e.g., a first set of data) (e.g., a new event) corresponding to a first stream of data (e.g., the first set of data has been posted to the first stream of data) that is stored at a first location (e.g., of persistent or non-persistent memory) of the computer system. In some examples, the first stream of data includes sensor data (e.g., temperature, location, status of an input and/or output device, detection of a device being plugged into a portion of the computer system, and/or a power level of the computer system) detected by a sensor in communication with the computer system. In some examples, the first stream of data includes application and/or system data that is published by a process (e.g., a user process and/or a system process of the computer system) and/or an application of the computer system.

At 904, in response to detecting the first event, in accordance with a determination that a first set of one or more criteria is satisfied with respect to (e.g., the first set of one or more criteria can be used with different views and, when doing so, the first set of one or more criteria is specific to a view that is being used with) a first view (e.g., a materialized view) stored at a second location of the computer system, wherein the second location is different from the first location, the daemon updates (e.g., based on the first event) the first view before (e.g., and/or instead of) updating a second view (e.g., a materialized view) stored at a third location of the computer system (e.g., persistent or non-persistent memory of the computer system), wherein the third location is different from the first location and the second location. In some examples, updating the first view includes one or more operations described above with respect to method 800. In some examples, in response to detecting the first event and after updating the first view before updating the second view, the daemon updates the second view. In some examples, the first set of one or more criteria is satisfied when a determination is made that the first view should be updated before the second view. In some examples, the first view and the second view are configured to be updated based on (e.g., depend on) the first event. In some examples, after and/or in response to detecting the first event and after updating the first view, the daemon updates the second view (e.g., when the second view has not already been updated based on the first event).

At 906, in response to detecting the first event, in accordance with a determination that a second set of one or more criteria (e.g., the first set of one or more criteria or another set of one or more criteria different from the first set of one or more criteria) is satisfied with respect to the second view, the daemon updates (e.g., based on the first event) the second view before updating the first view. In some examples, updating the second view includes one or more operations described above with respect to method 800. In some examples, in response to detecting the first event and after updating the second view before updating the first view, the daemon updates the first view. In some examples, the second set of one or more criteria is satisfied when a determination is made that the second view should be updated before the first view. In some examples, after and/or in response to detecting the first event and after updating the second view, the daemon updates the first view (e.g., when the first view has not already been updated based on the first event).

In some examples, in response to detecting the first event and in accordance with a determination that a third set of one or more criteria (e.g., the second set of one or more criteria and/or another set of one or more criteria different from the second set of one or more criteria) is satisfied with respect to the first view, the daemon forgoes updating the first view in response to detecting the first event. In some examples, after detecting the first event (e.g., not in response to but instead at some point later, such as when another event is detected and/or a set of one or more criteria is satisfied (e.g., the computer system has at least a threshold amount of resources available to update the first view)), the daemon updates the first view (e.g., based on the first event) (e.g., without, before, or after updating the second view).

In some examples, in response to detecting the first event and in accordance with a determination that a fourth set of one or more criteria (e.g., the first set of one or more criteria and/or another set of one or more criteria different from the first set of one or more criteria) is satisfied with respect to the second view, the daemon forgoes updating the second view in response to detecting the first event. In some examples, after detecting the first event (e.g., not in response to but instead at some point later, such as when another event is detected and/or a set of one or more criteria is satisfied (e.g., the computer system has at least a threshold amount of resources available to update the second view)), the daemon updates the second view (e.g., based on the first event) (e.g., without, before, or after updating the first view).

In some examples, after detecting the first event, the daemon detects a second event corresponding to a second stream of data (e.g., the first stream of data or another stream of data different from the first stream of data), wherein the second event is different (e.g., separate, such as received at a later time) from the first event. In some examples, in response to detecting the second event, the daemon updates the first view (e.g., without or before updating the second view) (e.g., no determination is made between two different views and instead the first view is updated before any other view) (e.g., based on the second event).

In some examples, after detecting the first event, the daemon detects a third event corresponding to a third stream of data (e.g., the first stream of data, the second stream of data, or another stream of data different from the first and the second stream of data), wherein the third event is different from the first event. In some examples, in response to detecting the third event, the daemon updates the second view (e.g., without or before updating the first view) (e.g., no determination is made between two different views and instead the second view is updated before any other view) (e.g., based on the third event).

In some examples, after detecting the first event, the daemon detects a fourth event (e.g., the second event, the third event, or another event different from the second and the third event) corresponding to a fourth stream of data (e.g., the first stream of data, the second stream of data, the third stream of data, and/or another stream of data different from the first, the second, and/or the third stream of data), wherein the fourth event is different from the first event. In some examples, in response to detecting the fourth event, the daemon updates a third view (e.g., a materialized view) (e.g., different from the first view and/or the second view) stored at a fourth location of the computer system (e.g., persistent or non-persistent memory of the computer system), wherein the fourth location is different from the first location and the second location. In some examples, the fourth location is different from the third location.

In some examples, in response to detecting a fifth event (e.g., the first event, the second event, the third event, the fourth event, and/or another event different from the first, the second, the third, and/or the fourth event) corresponding to a fifth stream of data (e.g., the first stream of data, the second stream of data, the third stream of data, the fourth stream of data, and/or another stream of data different from the first, the second, the third, and/or the fourth stream of data) and in accordance with a determination that a third set of one or more criteria is satisfied, wherein the third set of one or more criteria includes a criterion based on a power supply (e.g., a power source) (e.g., a type of the power supply, such as whether the power supply is battery powered) (e.g., an amount of power remaining for the power supply) of the computer system, the daemon updates a fourth view stored at a fifth location of the computer system (e.g., before updating a fifth view stored at a sixth location of the computer system). In some examples, the fifth view is different from the fourth view. In some examples, the sixth location is different from the fifth location. In some examples, the fourth view is updated when a characteristic of the power supply exceeds a threshold (e.g., an amount of power remaining with respect to the power supply). In some examples, in response to detecting the fifth event and in accordance with a determination that the third set of one or more criteria is not satisfied, the daemon forgoes updating the fourth view in response to detecting the fifth event. In some examples, in accordance with a determination that a fourth set of one or more criteria is satisfied, wherein the fourth set of one or more criteria includes a criterion based on the power supply of the computer system, the daemon updates the fifth view before updating the fourth view. In some examples, after detecting a threshold number of events corresponding to the fifth stream of data, the daemon updates the fourth view in accordance with a determination that the first set of one or more criteria is not satisfied. In some examples, after detecting a sixth event corresponding to the fifth stream of data, the daemon updates the fourth view (based on the fifth event and the sixth event) in accordance with a determination that the first set of one or more criteria is satisfied. In some examples, the fourth view is not updated when a characteristic of the power supply does not exceed a threshold (e.g., an amount of power remaining with respect to the power supply).

In some examples, after detecting the first event, the daemon detects a seventh event (e.g., the second event, the third event, the fourth event, the fifth event, the sixth event, and/or another event different from the second, the third, the fourth, the fifth, and/or the sixth event) corresponding to a sixth stream of data (e.g., that is stored at a seventh location of the computer system) (e.g., the first stream of data, the second stream of data, the third stream of data, the fourth stream of data, the fifth stream of data, and/or another stream of data different from the first, the second, the third, the fourth, and/or the fifth stream of data), wherein the seventh event is different from the first event. In some examples, in response to detecting the seventh event and in accordance with a determination that a fifth set of one or more criteria is satisfied, wherein the fifth set of one or more criteria includes a criterion based on a resource bandwidth (e.g., a performance bandwidth, a bandwidth measurement, measure, value, and/or state, and/or a set of one or more bandwidths) (e.g., an amount of memory, processor time, and/or network bandwidth) of the computer system, the daemon updates a sixth view (e.g., a materialized view) before (and/or instead of) updating a seventh view (e.g., a materialized view), wherein the sixth view is stored at an eighth location of the computer system, wherein the seventh view is stored at a ninth location of the computer system, wherein the ninth location is different from the first location and the eighth location, and wherein the eighth location is different from the first location. In some examples, the sixth view is updated first when the resource bandwidth exceeds a threshold (e.g., an amount of memory, processor time, and/or network bandwidth remaining). In some examples, in response to detecting the seventh event and in accordance with a determination that a sixth set of one or more criteria is satisfied, wherein the sixth set of one or more criteria includes a criterion based on the resource bandwidth of the computer system, the daemon updates the seventh view before (and/or instead of) updating the sixth view, wherein the sixth set of one or more criteria is different from the fifth set of one or more criteria. In some examples, the seventh view is updated first when the resource bandwidth is below a threshold (e.g., an amount of memory, processor time, and/or network bandwidth remaining).

In some examples, after detecting the first event, the daemon detects an eighth event (e.g., the second event, the third event, the fourth event, the fifth event, the sixth event, the seventh event, and/or another event different from the second, the third, the fourth, the fifth, the sixth, and/or the seventh event) corresponding to a seventh stream of data (e.g., that is stored at a tenth location of the computer system) (e.g., the first stream of data, the second stream of data, the third stream of data, the fourth stream of data, the fifth stream of data, the sixth stream of data, and/or another stream of data different from the first, the second, the third, the fourth, the fifth, the sixth and/or the seventh stream of data), wherein the eighth event is different from the first event. In some examples, in response to detecting the eighth event and in accordance with a determination that a seventh set of one or more criteria is satisfied, wherein the seventh set of one or more criteria includes a criterion based on a length of time of data included in an eighth view (e.g., a materialized view) (e.g., the eighth view corresponds to the length of time of data) (e.g., the eighth view includes data from the length of time of data) (e.g., the eighth view includes data from the last day, week, month, or year) that is stored at an eleventh location of the computer system, the daemon updates the eighth view before (and/or instead of) updating a ninth view (e.g., a materialized view) that is stored at a twelfth location of the computer system (e.g., updating a view that corresponds to less amount of time before updating a view that corresponds to more amount of time), wherein the twelfth location is different from the first location and the eleventh location, and wherein the eleventh location is different from the first location. In some examples, in response to detecting the eighth event and in accordance with a determination that an eighth set of one or more criteria is satisfied, wherein the eighth set of one or more criteria includes a criterion based on a length of time of data included in the ninth view, the daemon updates the ninth view before (and/or instead of) updating the eighth view.

In some examples, after detecting the first event, the daemon detects a ninth event (e.g., the second event, the third event, the fourth event, the fifth event, the sixth event, the seventh event, the eighth event, and/or another event different from the second, the third, the fourth, the fifth, the sixth, the seventh, and/or the eighth event) corresponding to an eighth stream of data (e.g., that is stored at a thirteenth location of the computer system) (e.g., the first stream of data, the second stream of data, the third stream of data, the fourth stream of data, the fifth stream of data, the sixth stream of data, the seventh stream of data, and/or another stream of data different from the first, the second, the third, the fourth, the fifth, the sixth, the seventh, and/or the eighth stream of data), wherein the ninth event is different from the first event. In some examples, in response to detecting the ninth event and in accordance with a determination that a ninth set of one or more criteria is satisfied, wherein the ninth set of one or more criteria includes a criterion based on a current time of day, the daemon updates a tenth view before (and/or instead of) updating an eleventh view (e.g., a materialized view), wherein the tenth view is stored at a fourteenth location of the computer system (e.g., updating a view that is more likely to be used sooner to the current time of day before updating a view that is less likely to be used sooner to the current time of day), wherein the eleventh view is stored at a fifteenth location of the computer system, wherein the fifteenth location is different from the first location and the fourteenth location, and wherein the fourteenth location is different from the first location. In some examples, in response to detecting the ninth event and in accordance with a determination that a tenth set of one or more criteria is satisfied, wherein the tenth set of one or more criteria includes a criterion based on the current time of day, the daemon updates the eleventh view before (and/or instead of) updating the tenth view.

In some examples, after detecting the first event, the daemon detects a tenth event (e.g., the second event, the third event, the fourth event, the fifth event, the sixth event, the seventh event, the eighth event, the ninth event, and/or another event different from the second, the third, the fourth, the fifth, the sixth, the seventh, the eighth, and/or the ninth event) corresponding to ninth stream of data (e.g., that is stored at a sixteenth location of the computer system) (e.g., the first stream of data, the second stream of data, the third stream of data, the fourth stream of data, the fifth stream of data, the sixth stream of data, the seventh stream of data, the eighth stream of data, the ninth stream of data, and/or another stream of data different from the first, the second, the third, the fourth, the fifth, the sixth, the seventh, the eighth, and/or the ninth stream of data), wherein the tenth event is different from the first event. In some examples, in response to detecting the tenth event and in accordance with a determination that an eleventh set of one or more criteria is satisfied, wherein the eleventh set of one or more criteria includes a criterion that is satisfied when a twelfth view (e.g., a materialized view) depends on a thirteenth view (e.g., a materialized view), the daemon updates the thirteenth view before (and/or instead of) updating the twelfth view, wherein the twelfth view is stored at a seventeenth location of the computer system, wherein the thirteenth view is stored at a eighteenth location of the computer system, wherein the eighteenth location is different from the first location and the seventeenth location, and wherein the seventeenth location is different from the first location. In some examples, in response to detecting the tenth event and in accordance with a determination that a twelfth set of one or more criteria is satisfied, wherein the twelfth set of one or more criteria includes a criterion that is satisfied when the thirteenth view depends on the twelfth view, the daemon updates the twelfth view before (and/or instead of) updating the thirteenth view.

In some examples, after detecting the first event, the daemon detects an eleventh event (e.g., the second event, the third event, the fourth event, the fifth event, the sixth event, the seventh event, the eighth event, the ninth event, the tenth event, and/or another event different from the second, the third, the fourth, the fifth, the sixth, the seventh, the eighth, the ninth, and/or the tenth event) corresponding to a tenth stream of data (e.g., that is stored at a nineteenth location of the computer system) (e.g., the first stream of data, the second stream of data, the third stream of data, the fourth stream of data, the fifth stream of data, the sixth stream of data, the seventh stream of data, the eighth stream of data, the ninth stream of data, the tenth stream of data, and/or another stream of data different from the first, the second, the third, the fourth, the fifth, the sixth, the seventh, the eighth, the ninth, and/or the tenth stream of data), wherein the eleventh event is different from the first event. In some examples, in response to detecting the eleventh event and in accordance with a determination that a thirteenth set of one or more criteria is satisfied, wherein the thirteenth set of one or more criteria includes a criterion that is satisfied when a fourteenth view (e.g., a materialized view) depends on a fifteenth view (e.g., a materialized view), the daemon updates the fifteenth view without updating the fourteenth view (e.g., until a later time and/or another event is detected), wherein the fourteenth view is stored at a twentieth location of the computer system, wherein the fifteenth view is stored at a twentieth twenty-first location of the computer system, wherein the twenty-first location is different from the first location and the twentieth location, and wherein the twentieth location is different from the first location.

In some examples, after detecting the first event, the daemon detects an eleventh event (e.g., the second event, the third event, the fourth event, the fifth event, the sixth event, the seventh event, the eighth event, the ninth event, the tenth event, and/or another event different from the second, the third, the fourth, the fifth, the sixth, the seventh, the eighth, the ninth, and/or the tenth event) corresponding to a tenth stream of data (e.g., that is stored at a nineteenth location of the computer system) (e.g., the first stream of data, the second stream of data, the third stream of data, the fourth stream of data, the fifth stream of data, the sixth stream of data, the seventh stream of data, the eighth stream of data, the ninth stream of data, the tenth stream of data, and/or another stream of data different from the first, the second, the third, the fourth, the fifth, the sixth, the seventh, the eighth, the ninth, and/or the tenth stream of data), wherein the eleventh event is different from the first event. In some examples, in response to detecting the eleventh event and in accordance with a determination that a thirteenth set of one or more criteria is satisfied, wherein the thirteenth set of one or more criteria includes a criterion that is satisfied when a fourteenth view (e.g., a materialized view) depends on a fifteenth view (e.g., a materialized view), the daemon updates the fifteenth view without updating the fourteenth view (e.g., until a later time and/or another event is detected), wherein the fourteenth view is stored at a twentieth location of the computer system, wherein the fifteenth view is stored at a twentieth twenty-first location of the computer system, wherein the twenty-first location is different from the first location and the twentieth location, and wherein the twentieth location is different from the first location.

In some examples, the determination that the first set of one or more criteria is satisfied includes a determination that a number of events (e.g., one or more) have been detected. In some examples, the number of events is greater than one. In some examples, the determination that the first set of one or more criteria is satisfied includes a determination that the number of events requires an amount of resources (e.g., time, memory, processor time, and/or number of operations to be performed) to process. In some examples, the determination that the first set of one or more criteria is satisfied includes a determination that the amount of resources corresponds to a target threshold (e.g., the target threshold corresponds to a target amount of resources to be used when updating one or more views). In some examples, one or more events are detected without updating one or more views until the amount of resources corresponds to the target threshold.

Note that details of the processes described above with respect to method 900 (e.g., FIG. 9) are also applicable in an analogous manner to the methods described herein. For example, method 600 optionally includes one or more of the characteristics of the various methods described above with reference to method 900. For example, the first event of method 900 can be the first set of data of method 600. For brevity, these details are not repeated below.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a device interacts with a user. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to change how a device interacts with a user. Accordingly, use of such personal information data enables better user interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be displayed to users by inferring location based on non-personal information data or a bare minimum amount of personal information, such as the content being requested by the device associated with a user or other non-personal information.

What is claimed is:
1. A method, comprising:
   at a first process executing on a first computer system:
      receiving, from a second process executing on the first computer system, a request to synchronize a first item;

identifying a first set of data of the first item, wherein the first set of data corresponds to the first computer system;

identifying a second set of data of the first item, wherein the second set of data is different from the first set of data; and synchronizing, with a second computer system different from the first computer system, the second set of data without synchronizing the first set of data.

2. The method of claim 1, wherein synchronizing the second set of data occurs in response to receiving, from the second computer system, a state vector that does not include an identifier of the second set of data.

3. The method of claim 1, wherein synchronizing the second set of data includes sending, to the second computer system, a hash of the second set of data.

4. The method of claim 1, wherein synchronizing the second set of data with the second computer system includes:

receiving, from the second computer system, a request for the second set of data; and in response to receiving the request for the second set of data, sending, to the second computer system, the second set of data.

5. The method of claim 1, further comprising:

as part of synchronizing with the second computer system:

sending, to the second computer system, a state vector for synchronized items known by the first process;

receiving, from the second computer system, one or more hash values;

in response to receiving the one or more hash values:

in accordance with a determination that a first hash value of the one or more hash values is not known by the first process, sending a request for data corresponding to the first hash value; and in accordance with a determination that a second hash value of the one or more hash values is known by the first process, updating an object corresponding to the second hash value to include a computer system corresponding to the second hash value; and after sending the request for the data corresponding to the first hash value, receiving the data corresponding to the first hash value.

6. The method of claim 1, wherein the first item is an item of a first type, the method further comprising:

receiving a request to synchronize a second item of a second type different from the first type;

identifying a third set of data of the second item, wherein the third set of data is specific to the first computer system;

identifying a fourth set of data of the second item, wherein the fourth set of data is not specific to the first computer system, and wherein the fourth set of data is different from the third set of data; and synchronizing, with the second computer system, the fourth set of data without synchronizing the third set of data.

7. The method of claim 6, wherein the request to synchronize the second item is received from a third process executing on the first computer system, and wherein the third process is different from the first process and the second process.

8. The method of claim 1, further comprising:

after synchronizing the second set of data, receiving, from a fourth process executing on the first computer system, a first request corresponding to the first item, wherein the fourth process is different from the first process; and in response to receiving the first request corresponding to the first item, sending to the fourth process, a first state vector including an indication of the first set of data and a second state vector including an indication of the second set of data, wherein the second state vector is different from the first state vector.

9. The method of claim 1, further comprising:

after synchronizing the second set of data with the second computer system, receiving, from a fifth process executing on the first computer system, a second request corresponding to the first item, wherein the fifth process is different from the first process; and in response to receiving the second request corresponding to the first item:

in accordance with a determination that the second computer system includes an item with data matching the second set of data, sending, to the fifth process, an indication of the first computer system and an indication of the second computer system; and in accordance with a determination that the second computer system does not include an item with data matching the second set of data, sending, to the fifth process, the indication of the first computer system without the indication of the second computer system.

10. The method of claim 1, further comprising:

after synchronizing the second set of data with the second computer system, receiving, from a sixth process executing on the first computer system, a third request corresponding to the first item, wherein the sixth process is different from the first process; and in response to receiving the third request corresponding to the first item, sending to the sixth process, the first set of data.

11. The method of claim 1, further comprising:

after synchronizing the second set of data with the second computer system, receiving, from the second process, an indication of an update to the first item; and in response to receiving the indication of the update to the first item:

in accordance with a determination that the update at least partially corresponds to data not specific to the first computer system:

updating the second set of data; and synchronizing, with the second computer system, the updated second set of data without synchronizing data specific to the first computer system; and in accordance with a determination that the update at least partially corresponds to data specific to the first computer system:

updating the first set of data; and forgoing synchronizing, with the second computer system, the updated first set of data.

12. The method of claim 1, further comprising:

after synchronizing the second set of data with the second computer system, receiving, from the second process, an indication of a current state of the first item; and after receiving the current state of the first item, comparing the current state of the first item with a previous state of the first item; and in response to comparing the current state of the first item with the previous state of the first item:

in accordance with a determination that data of the first item not specific to the first computer system has been updated:
: updating the second set of data to generate an updated second set of data; and
: synchronizing, with the second computer system, the updated second set of data without synchronizing data specific to the first computer system; and in accordance with a determination that data of the first item specific to the first computer system has been updated:
: updating the first set of data to generate an updated first set of data; and
: forgoing synchronizing, with the second computer system, the updated first set of data.

13. The method of claim 1, wherein the first set of data is specific to the first computer system and wherein the second data is not specific to the first computer system.

14. A non-transitory computer-readable storage medium storing one or more programs configured to be executed by one or more processors of a first computer system executing a first process, the one or more programs including instructions for:
: receiving, from a second process executing on the first computer system, a request to synchronize a first item;
: identifying a first set of data of the first item, wherein the first set of data corresponds to the first computer system;
: identifying a second set of data of the first item, wherein the second set of data is different from the first set of data; and
: synchronizing, with a second computer system different from the first computer system, the second set of data without synchronizing the first set of data.

15. The non-transitory computer-readable storage medium of claim 14, wherein synchronizing the second set of data occurs in response to receiving, from the second computer system, a state vector that does not include an identifier of the second set of data.

16. The non-transitory computer-readable storage medium of claim 14, wherein synchronizing the second set of data includes sending, to the second computer system, a hash of the second set of data.

17. The non-transitory computer-readable storage medium of claim 14, wherein synchronizing the second set of data with the second computer system includes:
: receiving, from the second computer system, a request for the second set of data; and
: in response to receiving the request for the second set of data, sending, to the second computer system, the second set of data.

18. The non-transitory computer-readable storage medium of claim 14, wherein the one or more programs further include instructions for:
: as part of synchronizing with the second computer system:
:: sending, to the second computer system, a state vector for synchronized items known by the first process;
:: receiving, from the second computer system, one or more hash values;
:: in response to receiving the one or more hash values:
::: in accordance with a determination that a first hash value of the one or more hash values is not known by the first process, sending a request for data corresponding to the first hash value; and
::: in accordance with a determination that a second hash value of the one or more hash values is known by the first process, updating an object corresponding to the second hash value to include a computer system corresponding to the second hash value; and
: after sending the request for the data corresponding to the first hash value, receiving the data corresponding to the first hash value.

19. The non-transitory computer-readable storage medium of claim 14, wherein the first item is an item of a first type, wherein the one or more programs further include instructions for:
: receiving a request to synchronize a second item of a second type different from the first type;
: identifying a third set of data of the second item, wherein the third set of data is specific to the first computer system;
: identifying a fourth set of data of the second item, wherein the fourth set of data is not specific to the first computer system, and wherein the fourth set of data is different from the third set of data; and
: synchronizing, with the second computer system, the fourth set of data without synchronizing the third set of data.

20. The non-transitory computer-readable storage medium of claim 19, wherein the request to synchronize the second item is received from a third process executing on the first computer system, and wherein the third process is different from the first process and the second process.

21. The non-transitory computer-readable storage medium of claim 14, wherein the one or more programs further include instructions for:
: after synchronizing the second set of data, receiving, from a fourth process executing on the first computer system, a first request corresponding to the first item, wherein the fourth process is different from the first process; and
: in response to receiving the first request corresponding to the first item, sending to the fourth process, a first state vector including an indication of the first set of data and a second state vector including an indication of the second set of data, wherein the second state vector is different from the first state vector.

22. The non-transitory computer-readable storage medium of claim 14, wherein the one or more programs further include instructions for:
: after synchronizing the second set of data with the second computer system, receiving, from a fifth process executing on the first computer system, a second request corresponding to the first item, wherein the fifth process is different from the first process; and
: in response to receiving the second request corresponding to the first item:
:: in accordance with a determination that the second computer system includes an item with data matching the second set of data, sending, to the fifth process, an indication of the first computer system and an indication of the second computer system; and
:: in accordance with a determination that the second computer system does not include an item with data matching the second set of data, sending, to the fifth process, the indication of the first computer system without the indication of the second computer system.

23. The non-transitory computer-readable storage medium of claim 14, wherein the one or more programs further include instructions for:

after synchronizing the second set of data with the second computer system, receiving, from a sixth process executing on the first computer system, a third request corresponding to the first item, wherein the sixth process is different from the first process; and in response to receiving the third request corresponding to the first item, sending to the sixth process, the first set of data.

24. The non-transitory computer-readable storage medium of claim 14, wherein the one or more programs further include instructions for:

after synchronizing the second set of data with the second computer system, receiving, from the second process, an indication of an update to the first item; and in response to receiving the indication of the update to the first item:

in accordance with a determination that the update at least partially corresponds to data not specific to the first computer system:

updating the second set of data; and synchronizing, with the second computer system, the updated second set of data without synchronizing data specific to the first computer system; and in accordance with a determination that the update at least partially corresponds to data specific to the first computer system:

updating the first set of data; and forgoing synchronizing, with the second computer system, the updated first set of data.

25. The non-transitory computer-readable storage medium of claim 14, wherein the one or more programs further include instructions for:

after synchronizing the second set of data with the second computer system, receiving, from the second process, an indication of a current state of the first item; and after receiving the current state of the first item, comparing the current state of the first item with a previous state of the first item; and in response to comparing the current state of the first item with the previous state of the first item:

in accordance with a determination that data of the first item not specific to the first computer system has been updated:

updating the second set of data to generate an updated second set of data; and synchronizing, with the second computer system, the updated second set of data without synchronizing data specific to the first computer system; and in accordance with a determination that data of the first item specific to the first computer system has been updated:

updating the first set of data to generate an updated first set of data; and forgoing synchronizing, with the second computer system, the updated first set of data.

26. The non-transitory computer-readable storage medium of claim 14, wherein the first set of data is specific to the first computer system and wherein the second data is not specific to the first computer system.

27. A first computer system, comprising:
one or more processors; and
memory storing one or more programs configured to be executed by the one or more processors, the one or more programs including instructions for a first process to:

receive, from a second process executing on the first computer system, a request to synchronize a first item;

identifying a first set of data of the first item, wherein the first set of data corresponds to the first computer system;

identifying a second set of data of the first item, wherein the second set of data is different from the first set of data; and synchronize, with a second computer system different from the first computer system, the second set of data without synchronizing the first set of data.

28. The first computer system of claim 27, wherein synchronizing the second set of data occurs in response to receiving, from the second computer system, a state vector that does not include an identifier of the second set of data.

29. The first computer system of claim 27, wherein synchronizing the second set of data includes sending, to the second computer system, a hash of the second set of data.

30. The first computer system of claim 27, wherein synchronizing the second set of data with the second computer system includes:

receiving, from the second computer system, a request for the second set of data; and in response to receiving the request for the second set of data, sending, to the second computer system, the second set of data.

31. The first computer system of claim 27, wherein the one or more programs further include instructions for the first process to:

as part of synchronizing with the second computer system:

send, to the second computer system, a state vector for synchronized items known by the first process;

receive, from the second computer system, one or more hash values;

in response to receiving the one or more hash values:

in accordance with a determination that a first hash value of the one or more hash values is not known by the first process, send a request for data corresponding to the first hash value; and in accordance with a determination that a second hash value of the one or more hash values is known by the first process, update an object corresponding to the second hash value to include a computer system corresponding to the second hash value; and after sending the request for the data corresponding to the first hash value, receive the data corresponding to the first hash value.

32. The first computer system of claim 27, wherein the first item is an item of a first type, wherein the one or more programs further include instructions for:

receive a request to synchronize a second item of a second type different from the first type;

identify a third set of data of the second item, wherein the third set of data is specific to the first computer system;

identify a fourth set of data of the second item, wherein the fourth set of data is not specific to the first computer system, and wherein the fourth set of data is different from the third set of data; and synchronize, with the second computer system, the fourth set of data without synchronizing the third set of data.

33. The first computer system of claim 32, wherein the request to synchronize the second item is received from a third process executing on the first computer system, and wherein the third process is different from the first process and the second process.

34. The first computer system of claim 27, wherein the one or more programs further include instructions for the first process to:
after synchronizing the second set of data, receive, from a fourth process executing on the first computer system, a first request corresponding to the first item, wherein the fourth process is different from the first process; and
in response to receiving the first request corresponding to the first item, send to the fourth process, a first state vector including an indication of the first set of data and a second state vector including an indication of the second set of data, wherein the second state vector is different from the first state vector.

35. The first computer system of claim 27, wherein the one or more programs further include instructions for the first process to:
after synchronizing the second set of data with the second computer system, receive, from a fifth process executing on the first computer system, a second request corresponding to the first item, wherein the fifth process is different from the first process; and
in response to receiving the second request corresponding to the first item:
in accordance with a determination that the second computer system includes an item with data matching the second set of data, send, to the fifth process, an indication of the first computer system and an indication of the second computer system; and
in accordance with a determination that the second computer system does not include an item with data matching the second set of data, send, to the fifth process, the indication of the first computer system without the indication of the second computer system.

36. The first computer system of claim 27, wherein the one or more programs further include instructions for the first process to:
after synchronizing the second set of data with the second computer system, receive, from a sixth process executing on the first computer system, a third request corresponding to the first item, wherein the sixth process is different from the first process; and
in response to receiving the third request corresponding to the first item, send to the sixth process, the first set of data.

37. The first computer system of claim 27, wherein the one or more programs further include instructions for the first process to:
after synchronizing the second set of data with the second computer system, receive, from the second process, an indication of an update to the first item; and
in response to receiving the indication of the update to the first item:
in accordance with a determination that the update at least partially corresponds to data not specific to the first computer system:
update the second set of data; and
synchronize, with the second computer system, the updated second set of data without synchronizing data specific to the first computer system; and
in accordance with a determination that the update at least partially corresponds to data specific to the first computer system:
update the first set of data; and
forgo synchronizing, with the second computer system, the updated first set of data.

38. The first computer system of claim 27, wherein the one or more programs further include instructions for the first process to:
after synchronizing the second set of data with the second computer system, receive, from the second process, an indication of a current state of the first item; and
after receiving the current state of the first item, compare the current state of the first item with a previous state of the first item; and
in response to comparing the current state of the first item with the previous state of the first item:
in accordance with a determination that data of the first item not specific to the first computer system has been updated:
update the second set of data to generate an updated second set of data; and
synchronize, with the second computer system, the updated second set of data without synchronizing data specific to the first computer system; and
in accordance with a determination that data of the first item specific to the first computer system has been updated:
update the first set of data to generate an updated first set of data; and
forgo synchronizing, with the second computer system, the updated first set of data.

39. The first computer system of claim 27, wherein the first set of data is specific to the first computer system and wherein the second data is not specific to the first computer system.

* * * * *